United States Patent [19]
Wang

[11] Patent Number: 5,588,072
[45] Date of Patent: Dec. 24, 1996

[54] METHOD AND APPARATUS FOR SELECTING BLOCKS OF IMAGE DATA FROM IMAGE DATA HAVING BOTH HORIZONTALLY- AND VERTICALLY-ORIENTED BLOCKS

[75] Inventor: Shin-Ywan Wang, Tustin, Calif.

[73] Assignee: Canon Kabushiki Kaisha, Tokyo, Japan

[21] Appl. No.: 171,720

[22] Filed: Dec. 22, 1993

[51] Int. Cl.$^6$ .................................................. G06K 9/36
[52] U.S. Cl. ........................................ 382/176; 382/180
[58] Field of Search .................... 382/9, 22, 26, 382/46, 176, 180, 199, 204, 226, 289, 290; 358/453, 462, 464; H04N 1/387, 1/40

[56] References Cited

U.S. PATENT DOCUMENTS

| | | | |
|---|---|---|---|
| 4,741,045 | 4/1988 | Denning | 382/9 |
| 4,916,838 | 4/1990 | Holson | 40/159 |
| 4,926,490 | 5/1990 | Mano | 382/9 |
| 4,933,984 | 6/1990 | Nakano et al. | 382/61 |
| 4,988,852 | 1/1991 | Krishnan | 235/462 |
| 5,001,766 | 3/1991 | Baird | 382/46 |
| 5,021,676 | 6/1991 | Dragon et al. | 250/561 |
| 5,048,107 | 9/1991 | Tachikawa | 382/48 |
| 5,052,044 | 9/1991 | Gaborski | 382/32 |
| 5,054,094 | 10/1991 | Barski | 382/18 |
| 5,062,141 | 10/1991 | Nakayama et al. | 382/9 |
| 5,065,442 | 11/1991 | Kugai | 382/48 |
| 5,075,895 | 12/1991 | Bessho | 382/61 |
| 5,091,964 | 2/1992 | Shimomura | 382/9 |
| 5,093,868 | 3/1992 | Tanaka et al. | 382/9 |
| 5,101,439 | 3/1992 | Kiang | 382/9 |
| 5,101,448 | 3/1992 | Kawachiya et al. | 382/61 |
| 5,120,977 | 6/1992 | Dragon et al. | 250/561 |
| 5,129,012 | 7/1992 | Abe | 382/16 |
| 5,159,667 | 10/1992 | Borrey et al. | 395/148 |
| 5,172,422 | 12/1992 | Tan | 382/9 |
| 5,307,422 | 4/1994 | Wang | 382/9 |
| 5,313,526 | 5/1994 | Cheong | 382/9 |
| 5,317,652 | 5/1994 | Chatterjee | 382/49 |
| 5,335,290 | 8/1994 | Cullen et al. | 382/9 |
| 5,351,314 | 9/1994 | Vaezi | 382/54 |

FOREIGN PATENT DOCUMENTS

| | | | |
|---|---|---|---|
| 0472313 | 2/1992 | European Pat. Off. | G06K 9/32 |
| 0496531 | 7/1992 | European Pat. Off. | 382/9 |
| 567344 | 10/1993 | European Pat. Off. | G06K 9/20 |
| 4-90083 | 3/1992 | Japan | 382/9 |

OTHER PUBLICATIONS

M. Okamoto, et al., "A Hybrid Page Segemetation Method", Proceedings of the Second International Conference on Document Analysis and Recognition, Oct. 1993, pp. 743–748.

(List continued on next page.)

Primary Examiner—Leo Boudreau
Assistant Examiner—Andrew W. Johns
Attorney, Agent, or Firm—Fitzpatrick, Cella, Harper & Scinto

[57] ABSTRACT

Method and apparatus for selecting text and/or non-text blocks in a stored document includes functions and structure for identifying connected pixel components in a stored document, separating the identified pixel components into text and non-text components, searching the document for visible and invisible lines along edges of the non-text components, forming irregularly-shaped text and non-text blocks using the identified text components and the visible and invisible lines, detecting the text orientation for each formed text block, extracting text lines from the text block based on the detected orientation, detecting the skew angle for the stored document based on the extracted lines, and modifying the formed text and non-text blocks based on the detected skew angle. The thus-formed text blocks are preferably subjected to character recognition routines.

49 Claims, 25 Drawing Sheets

Microfiche Appendix Included
(3 Microfiche, 177 Pages)

OTHER PUBLICATIONS

D. J. Ittner, "Automatic Inference of Textline Orientation", Proccedings, Second Annual Symposium on Document Analysis & Information Retrieval, Apr. 1993, pp. 123–133.

Teruo Akiyama, et al., "Automated Entry System For Printed Documents", Pattern Recognition, vol. 23, No. 11, 1990, pp. 1141–1154.

Stuart C. Hinds, et al., "A Document Skew Detection Method Using Run–Length Encoding And The Hough Transform", IEEE, May 1990, pp. 464–468.

James L. Fisher, et al., "A Rule–Based System For Document Image Segmentation", IEEE, May 1990, pp. 567–572.

Philip J. Bones, et al., "Segmentation Of Document Images", SPIE vol. 1258 Image Communications and Workstations (1990), pp. 78–88.

Qin Luo, et al., "A Structure Recognition Method For Japanese Newspapers", Symposium on Document Analysis and Information Retrieval, Mar., 1992 pp. 217–234.

L. A. Fletcher, et al., "A Robust Algorithm For Text String Separation From Mixed Text/Graphics Images", IEEE Transactions On Pattern Analysis and Machine Intelligence, vol. 10, No. 6, Nov., 1988, pp. 910–918.

Osamu Iwaki, et al., "A Segmentation Method Based On Office Document Hierarchical Structure", Proceedings of the 1987 IEEE International Conference on Systems, Man, and Cybernetics, vol. 2, pp. 759–763.

K. Y. Wong, et al., "Document Analysis System", IBM J. Res. Develop., vol. 26, No. 6, Nov., 1982, pp. 647–656.

Isao Masuda, et al., "Approach to Smart Document Reader System", IEEE 1985, pp. 550–557.

Hiroshi Makino, "Representation And Segmentation Of Document Images", IEEE, 1983, pp. 291–296.

W. Doster, et al. "A Step Towards Intelligent Document Input To Computers", et al., IEEE, 1983, pp. 515–516.

English translation of Japanese Kokai 4–90083 to Nakatsuka, publ. Mar. 1992.

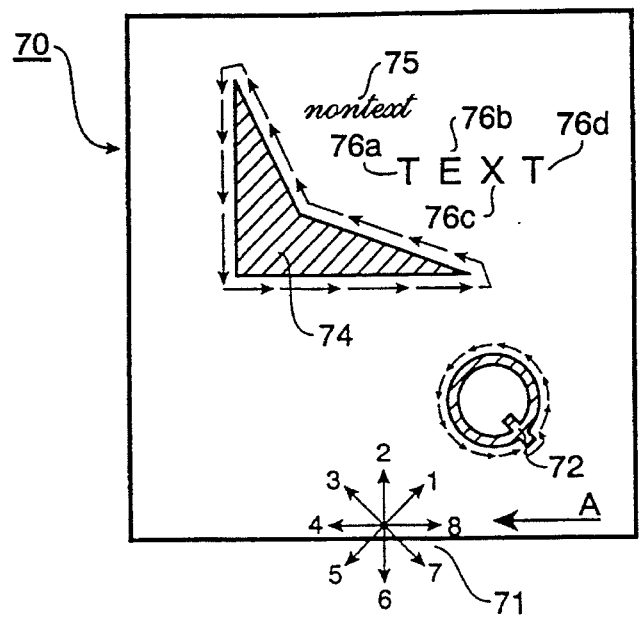
FIG. 7a
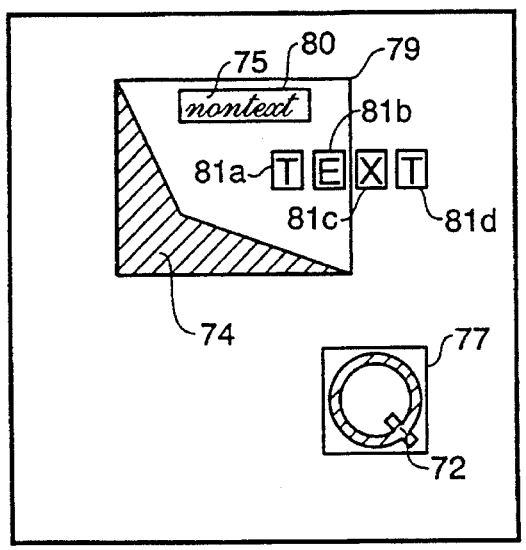
FIG. 7b
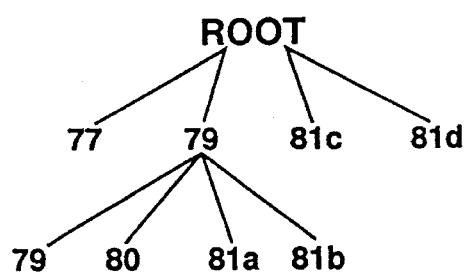
FIG. 7c
| FIG. 7a |
| FIG. 7b |
| FIG. 7c |
FIG. 7

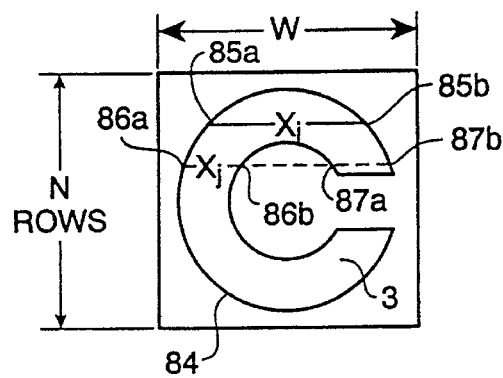
FIG. 8a
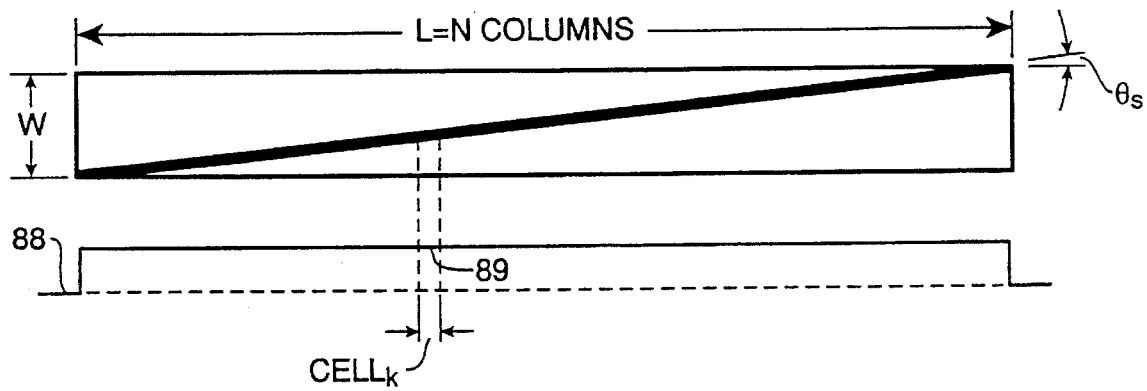
FIG. 8b
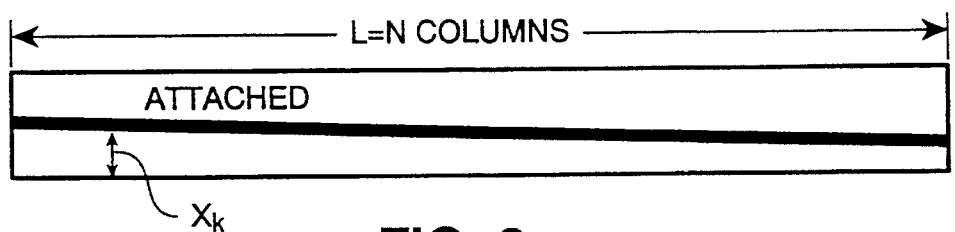
FIG. 8c
| FIG. 8a |
|---|
| FIG. 8b |
| FIG. 8c |
FIG. 8

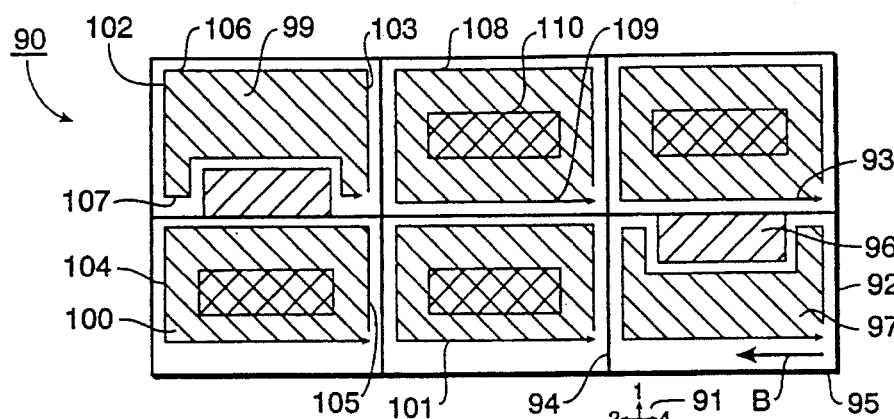
FIG. 9a
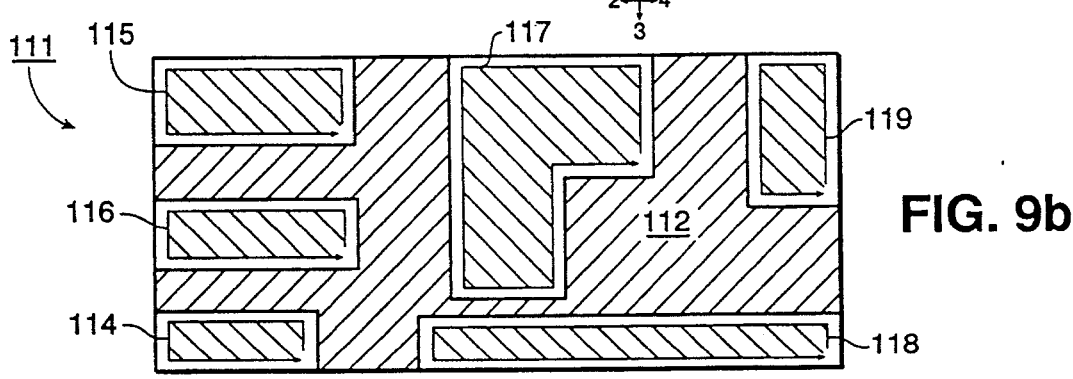
FIG. 9b
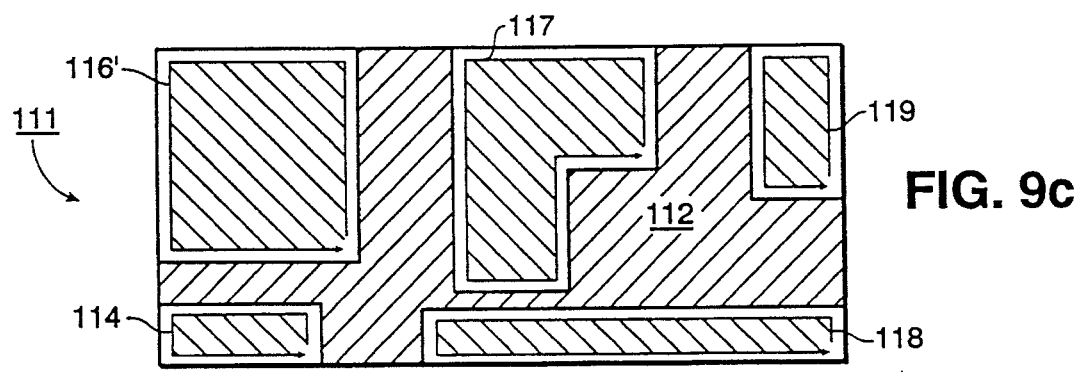
FIG. 9c
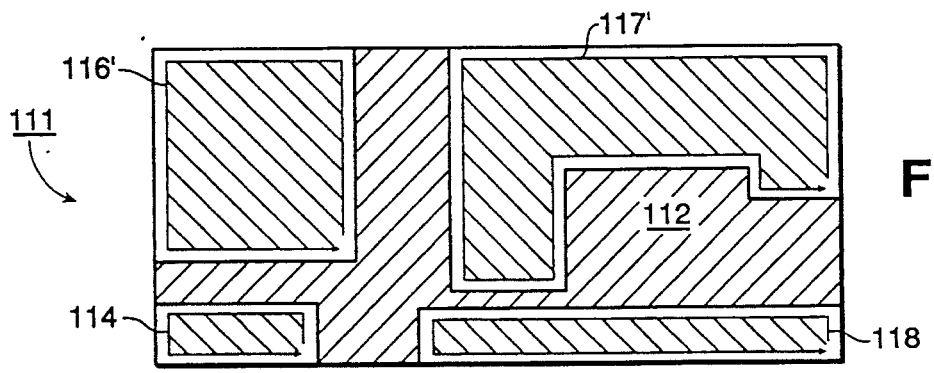
FIG. 9d
| FIG. 9a |
| FIG. 9b |
| FIG. 9c |
| FIG. 9d |
FIG. 9

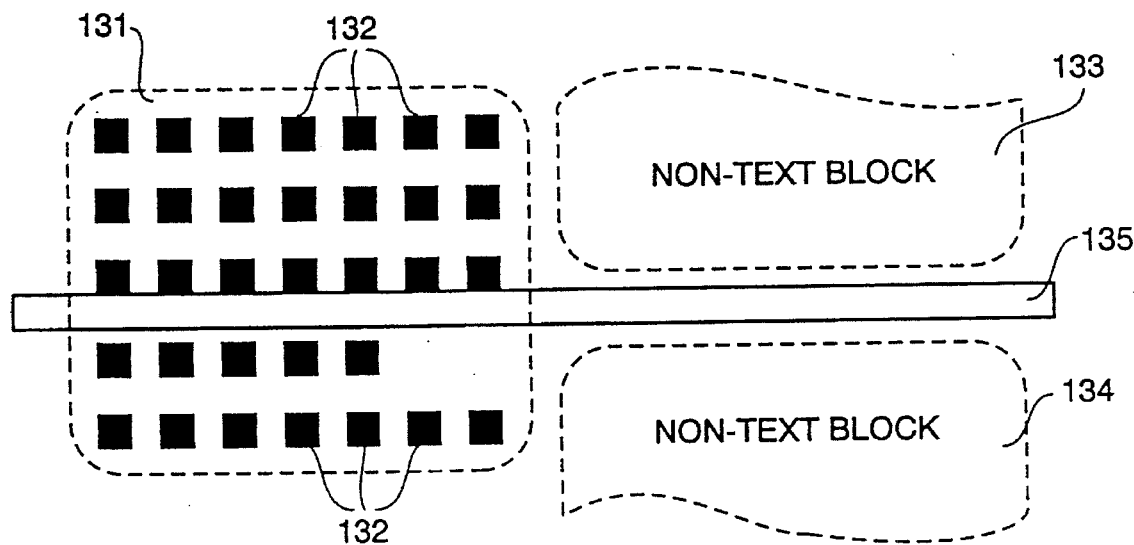
FIG. 13a
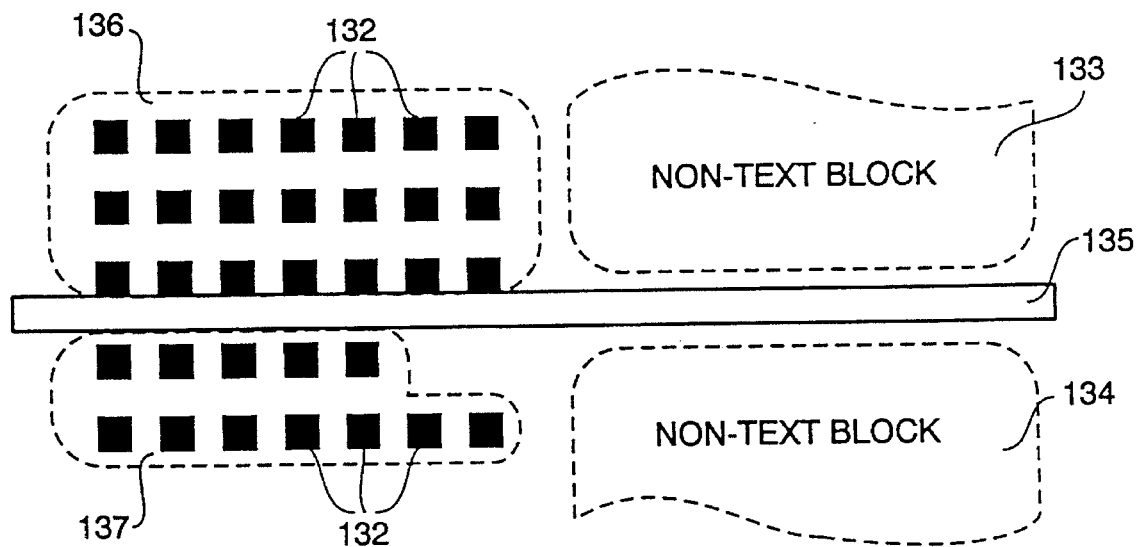
FIG. 13b
| FIG. 13a |
|----------|
| FIG. 13b |
FIG. 13

METHOD AND APPARATUS FOR SELECTING BLOCKS OF IMAGE DATA FROM IMAGE DATA HAVING BOTH HORIZONTALLY- AND VERTICALLY-ORIENTED BLOCKS

BACKGROUND OF THE INVENTION

This application is being filed with a microfiche appendix of computer program listings consisting of three (3) fiche having 269 frames.

A portion of the disclosure of this patent document contains material which is subject to copyright protection. The copyright owner has no objection to the facsimile reproduction by anyone of the document or the patent disclosure, as it appears in the Patent and Trademark Office patent file or records, but otherwise reserves all copyright rights whatsoever.

1. Field of the Invention

The present invention relates to a method and apparatus for processing character blocks prior to e.g., character recognition, and particularly to such a method and apparatus in which, prior to recognition, blocks of image data are classified and selected based on the characteristics of the image data. For example, blocks of image data may be selected and classified based on whether the image data is text image data (horizontal and/or vertical) or non-text image data such as halftone (or grey-scale) images, line drawings, tables, vertical or horizontal lines, vertical or horizontal slanting lines, frames or the like.

2. Description of the Related Art

In recent years, it has become possible to analyze images of text data so as to recognize individual characters in the text data and to form a computer-readable file of character codes corresponding to the recognized characters. Such files can then be manipulated in word-processing, data-compression, or data-processing programs. Such systems, which are hereinafter referred to as "character recognition systems" are advantageous because they eliminate the need to re-type or otherwise re-enter text data. For example, it is possible to character-recognize a document which has been transmitted by facsimile or reproduced from microfilm or by a photocopier so as to form computer text files that contain character codes (e.g., ASCII) of the characters and numerals in the document, thereby permitting further word-processing or data-processing of the document without the need to re-type or re-enter the document.

Documents to be character-recognized often contain many different types of image data, not all of which can be recognized. For example, while it is currently possible to recognize text image data, it is very difficult to recognize non-text image data. Typically, documents to be character-recognized include blocks of text image data, and blocks of non-text image data such as halftone images, line drawings, lines and the like. In addition, the documents may include tables or tabularly arranged data which may or may not be framed. Accordingly, before character recognition processing, it is necessary for individual blocks in the document to be classified in accordance with the type of image data in the blocks and for text-type blocks to be selected from the image data.

FIG. 1 shows a page of a representative document. In FIG. 1, a document page 101 is arranged in a two-column format. The page includes title blocks 102 which include text information of large font size suitable for titles, text blocks 104, which include lines of text data, graphics block 105 which includes graphic images which are not text, table block 106 which includes a table of text or numerical information, and caption blocks 107 which include small sized text data and which are captions associated with blocks of graphic or tabular information. Each block of information is to be classified in accordance with the type of information contained therein and the blocks are then segmented based on that classification.

Previously, to detect text-type blocks of image data, it has been considered to smear the pixel image data horizontally and vertically by extending blackened pixels in the image data both horizontally and vertically into one or more adjacent white pixels. Smearing techniques like these are unsatisfactory because they rely on foreknowledge of characteristics of the text-type image data (for example, font size) so as to be able to choose smearing parameters properly. Moreover, small changes in smearing parameters can produce large changes in selection results. Smearing techniques are also not always able to preserve the internal structure of the original document. For example, smearing can cause a two-column original to be smeared into a single column. Such a situation is unsatisfactory because it jumbles the order in which text data is stored making it impossible to reconstruct the original text accurately. Moreover, it has been found that smearing techniques sometimes smear text-type data into non-text-type data and cause the entire region to be erroneously interpreted as text-type data.

U.S. patent application Ser. No. 07/873,012, filed Apr. 24, 1992, and commonly assigned, proposes another technique for selecting character blocks in a stored document. Therein, the stored document is first searched to find so-called "connected components", which may comprise two or more pixels connected together in any of the eight directions surrounding each pixel. Next, the text connected components are separated from the non-text connected components, and the non-text components are classified as, e.g., tables, halftone images, line drawings, etc. Next, the direction of any skew in the document is detected, and if the skew is vertical, the image is rotated ninety degrees and the connected components are again searched. After correction of the skew, invisible white lines along the edge of non-text components are searched for so that appropriate blocks of text, e.g., columns, can be identified. Thereafter, the horizontal text lines and title lines are formed, and the horizontal text lines are grouped into rectangularly-arrayed text blocks. Thereafter, post processing is performed to prepare the identified text blocks for further character recognition processing. Ser. No. 07/873,012 is incorporated herein by reference.

While the above-described block selection technique may be appropriate for horizontal documents, (e.g., English-language documents) it is possible for a page to contain both horizontal and vertical text blocks (bi-directional) For example, a Japanese document may contain vertical Kanji characters in combination with horizontal characters such as tables and figure legends. Also, certain English documents include vertically-extending characters in order to highlight certain information or to provide some desired effect.

Furthermore, the scanned page itself is often skewed, and the above-described block selection technique handles this problem by first identifying the skew and then rotating the image before the formation of the text block. Speed and accuracy become two practical problems when utilizing this technique. In more detail, in the block-selection technique described above, the block area is represented by a rectangle, and the boundaries of the non-text blocks are also recorded. However, in the case of a skewed document, the rectangles may obscure the separation between the text blocks and may actually overlap. This leads to misclassification of data in the blocks and may lead to errors in character recognition.

Therefore, what is needed is a method and apparatus for effectively and efficiently selecting text and non-text blocks in a stored document in which both vertical and horizontal text blocks may be recognized, and in which a skewed document is not required to be rotated prior to the formation of the text blocks. This provides a much more flexible block selection technique while saving processing time and increasing recognition accuracy.

SUMMARY OF THE INVENTION

It is an object of the present invention to overcome the foregoing difficulties.

According to one aspect of the present invention, method and apparatus for separating blocks of text areas and non-text areas of a stored document includes structure and steps for identifying connected pixel components, and separating the identified pixel components into text and non-text components. The non-text components are preferably classified into at least one of a predetermined plurality of non-text classifications. The stored document is then searched for visible lines and for invisible lines along edges of the non-text components. Text and non-text blocks are then formed using the identified text components and the visible and invisible lines. The text orientation for each formed text block is then detected, and text lines are extracted from each detected text block based on the detected text orientation. After the formation of the text blocks, the skew angle for the stored document is detected based on the extracted text lines. Then, the formed text and non-text blocks are modified based on the detected skew angle.

According to another aspect of the present invention, method and apparatus for forming text blocks in a stored document having both horizontal and vertical text includes structure and steps for identifying connected pixel components and grouping the connected components horizontally and vertically. Irregularly-shaped horizontal and vertical text blocks are then formed based on the grouped components and without having performed skew detection. Thereafter, the skew angle for each of the formed text blocks is detected, and the identified text blocks may be provided for further character processing such as character recognition.

According to a further aspect of the present invention, method and apparatus for forming text and non-text blocks in a stored document having non-text information and horizontal and vertical text information includes structure and steps for identifying connected pixel components, and separating the identified pixel components into text and non-text components. The connected text components are then grouped horizontally and vertically, and the document is searched for visible lines and for invisible lines along edges of the non-text components. Irregularly-shaped non-text blocks and irregularly-shaped horizontal and vertical text blocks are then formed based on the grouped text components and the visible and invisible lines, and without having performed skew detection. The text orientation for each formed text block is then detected, and the text lines are extracted from each detected text block based on the detected text orientation. Thereafter, the skew angle for each of the formed text and non-text blocks is detected, and the formed horizontal and vertical text blocks and the non-text blocks are modified based on the detected skew angle.

These and other features and advantages according to the present invention will be more readily understood by reference to the following detailed description of the preferred embodiment taken in conjunction with the attached drawings.

BRIEF DESCRIPTION OF THE DRAWINGS

FIG. 6, comprising

FIG. 7, including FIGS. 7A, 7B, and 7C, comprises views for explaining contour tracing.

FIG. 8, including FIGS. 8A, 8B, and 8C, comprises views for explaining classification processing for non-text units.

FIG. 9, including FIGS. 9A, 9B, 9C, and 9D, comprises views for explaining white contour processing.

FIG. 13, including FIGS. 13A and 13B, comprises schematic representations of step S57 in FIG. 5.

DETAILED DESCRIPTION OF THE PREFERRED EMBODIMENT

The present invention can be embodied in a variety of devices where character recognition processing is desired, such as image processing or image reproducing apparatuses including photocopiers, facsimile machines, video or still-video cameras, laser beam printers and the like. In such devices, images that include character images may be processed or reproduced such that the character images are character-recognition-processed. If desired, standardized character sets or fonts may be substituted for recognized character images, and the standard characters may be retransmitted or reproduced rather than the original character image. The invention can also be embodied in general purpose computers and office equipment, such as personal computers, word-processing or data-processing equipment and integrated office automation equipment which combines a number of business equipment tools in a single integrated package.

Figure 1:
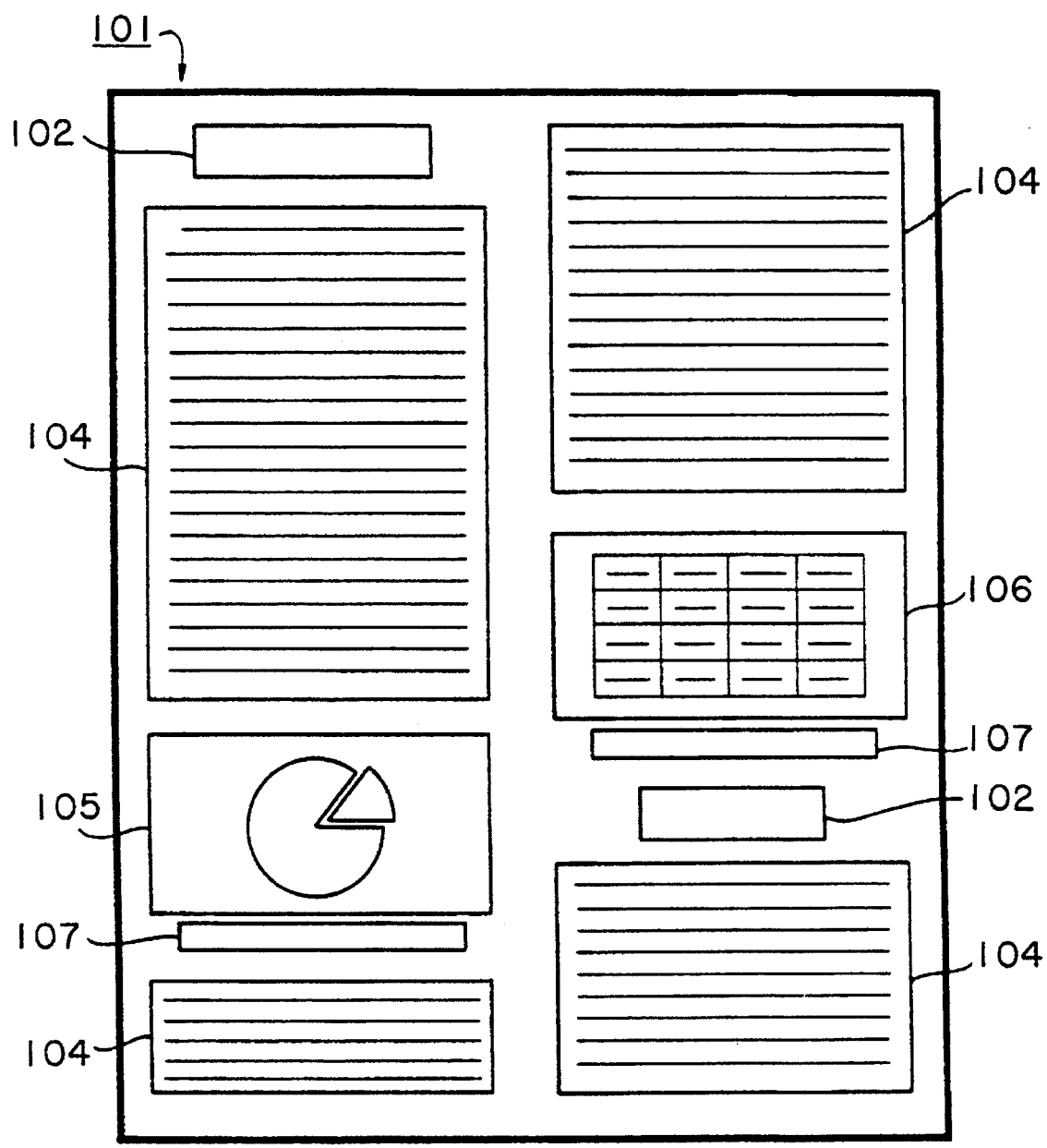
FIG. 1 is a representative page of a document to be character-recognized.
Figure 2:
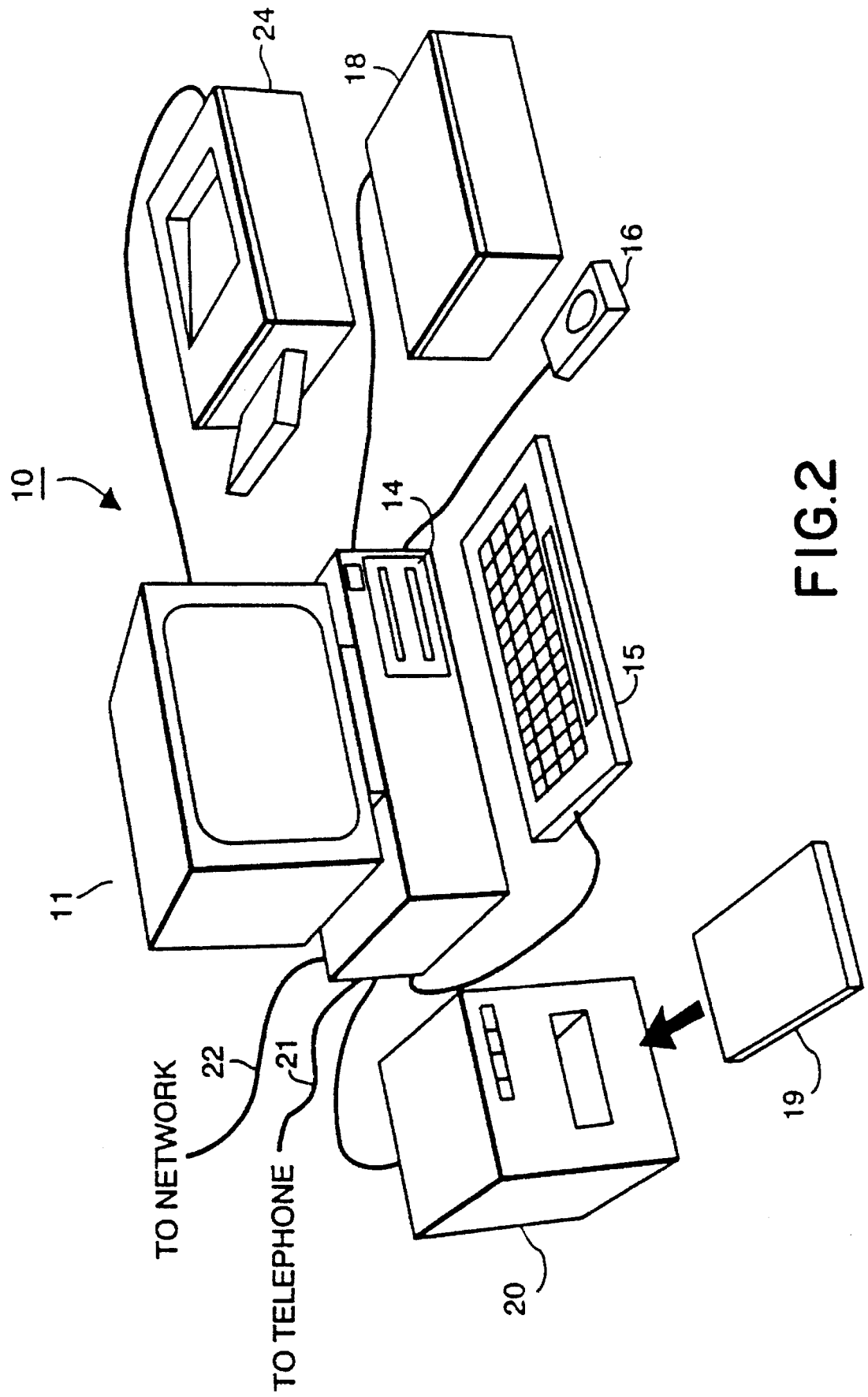
FIG. 2 is a perspective view of an apparatus according to the present invention.

FIG. 2 is a view showing the outward appearance of a representative embodiment of the present invention. Shown in FIG. 2 is computing equipment 10 such as an IBM-PC or PC-compatible computer having a graphical user interface operating system such as a microsoft windows operating system. The computing equipment 10 is provided with a display screen 11 such as a color monitor. Computing equipment 10 further includes a mass storage device such as computer disk drive 14 for storing data files such as black-and-white, half tone, and color bitmap images; and for storing application program files which contains stored program instruction sequences by which computing equipment 10 manipulates data files and presents data in those files to a computer operator via display screen 11. For example, the application programs on disk drive 14 may include an application program to access data on an optical disk, or other information processing programs.

A keyboard 15 is connected to computing equipment 10 to permit input of text data and to permit operator selection and manipulation of data displayed on display screen 11. Likewise, pointing device 16, such as a mouse or the like, is provided to permit selection and manipulation of objects on the display screen 11. Scanner 18 scans documents or other images and provides, e.g., bitmap images of those documents to computing equipment 10. Those images may be used immediately by computing equipment 10, or computing equipment 10 may store these images in disk drive 14 or on an optical disk such as disk 19 via optical disk drive 20. Bitmap image data may be retrieved from optical disk 19 or computer disk drive 14 for subsequently processing by computing equipment 10.

Other means for supplying bitmap image data and other data may be provided, through an unshown modem in computing equipment 10 via telephone link 21, or a network link 22. Likewise, a removable floppy disk drive may be provided, or digital or analog video information may be input to computing equipment 10 via an unshown video interface.

Printer 24 is provided for outputting information processed by computing equipment 10.

In accordance with computer operator instructions, and under the control of the operating system, stored application programs are selectively activated to process and manipulate input data. For example, and as described in more detail below, a character recognition program may be activated to permit an operator to scanned-in document images via scanner 18, and store them to optical disk 19. The operator may then retrieve the scanned-in documents from optical disk 19 in accordance with the operating system and applications programs.

Figure 3:
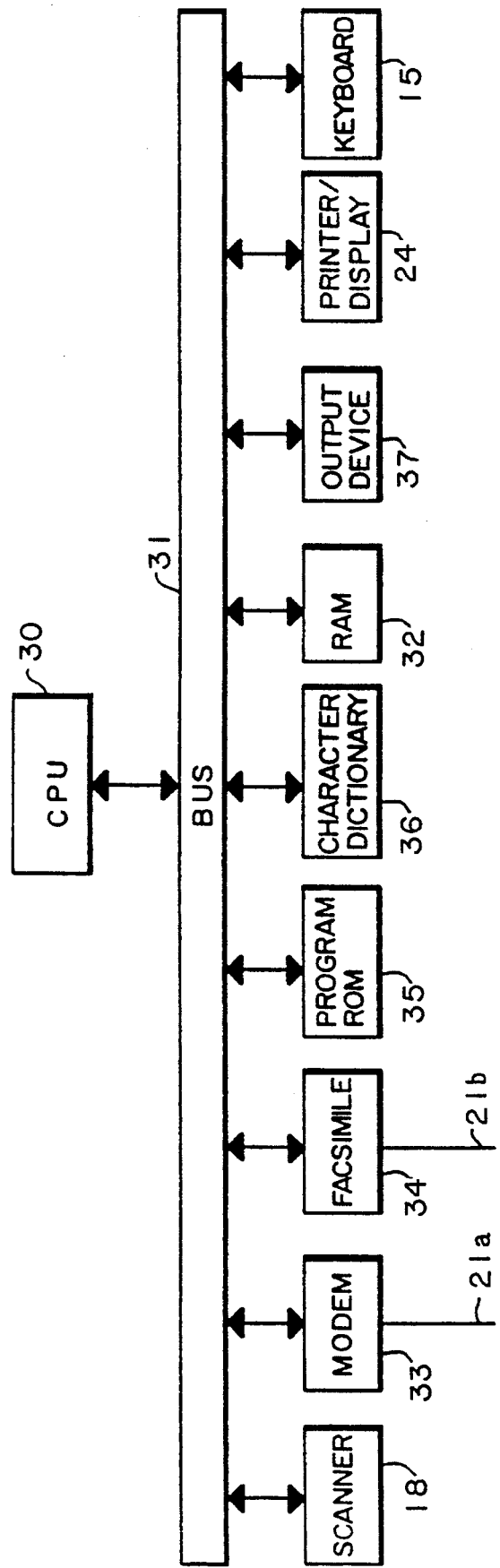
FIG. 3 is a block diagram of an apparatus according to the present invention.

FIG. 3 is a detailed block diagram of an embodiment of the invention in the form of integrated office automation equipment having scanning, facsimile, information transmission and reception, and information processing capabilities, the latter optionally including word-processing and data-processing capabilities.

In the apparatus shown in FIG. 3, images may be input by facsimile transmission to the apparatus, by scanning an original document into the apparatus, or by remote reception via a modem, or the like. With the invention, it is possible to recognize the characters in the image, to create a computer text file of recognized characters, and to employ word-processing, spreadsheet-processing or other information processing capabilities of the apparatus to modify the text file. The modified text file (or the unmodified text file) may subsequently be retransmitted or otherwise output, for example, by employing speech synthesis technology to "speak" the text file to a speaker or over ordinary voice telephone.

In FIG. 3, a central processing unit ("CPU") 30, such as a programmable microprocessor, is connected to a bus 31. Also connected to the bus are the scanner 18 for scanning an image pixel-by-pixel into image memory (for example RAM 32, described below), a modem 33 for sending and receiving digital data in analog form over telephone line 21a, and a facsimile device 34 (optionally including a telephone, not shown) for transmitting and receiving image data on telephone line 21b. Telephone lines 21a and 21b may be the same line or they may be coordinated through an unshown network control unit. Further connected to bus 31 are a read only memory ("ROM") 35 for storing one or more computer programs for execution by CPU 30, a character dictionary 36 for storing a dictionary of characters against which input characters are compared during recognition processing, random access memory ("RAM") 32 for storing input image data, processed image data, information concerning the structure of images and the like, an output device 37 (such as a disk memory or a speech synthesis device with a speaker and/or voice telephone line interface) to which the identity of characters recognized during character recognition processing is output, printer/display 24 for displaying images processed by the apparatus, and keyboard 15 for allowing operator control of the apparatus.

Although the devices connected to bus 31 are incorporated into an integrated office automation tool, it is understood that some or all of these devices can alternatively be provided on a stand-alone basis.

Scanner 18, modem 33 and facsimile 34 constitute alternative forms of input means for inputting image data into the apparatus. In the case of scanner 18, original documents are scanned line-by-line and pixel-by-pixel, and under the control of CPU 30 the pixels of image data are stored in bitmap memory format in image memory in RAM 32. In the case of modem 33, image data is received in analog form over telephone line 21a and converted into digital pixel form by modem 33 whereupon the digital pixel data is stored in image memory in RAM 32. In the case of facsimile 34, image data is received in compressed or coded form, such as modified-Huffman run length coding, over telephone line 21b. The compressed image data is uncompressed into digital image pixel data by means conventional in the art by facsimile 34, and CPU 30 stores the pixels of image data in bitmap format in image memory in RAM 32. Other input means are, of course, possible and the image data may simply be retrieved from a mass storage medium such as disk memory or derived from a video or still-video camera.

Facsimile 34 and output device 37 constitute alternative forms of output means for outputting character-recognized image data from the apparatus. In the case of facsimile 34, images of characters that have been recognition-processed according to the invention may be replaced by standard character sets or fonts, and transmitted from the apparatus. This allows, for example, for the reception of an image including character images, to character-recognize the character images, and to replace the recognized characters with standardized character fonts prior to re-transmission, thereby improving the quality of degraded images.

Modem 33 and output device 37 are alternative means for outputting and storing the identity of characters recognized in image data, for example, in ASCII code. The characters' identities may be stored in the apparatus (such as in a disk memory) or may be output for transmission to a remote location via modem 33. Means may also be provided for reformatting the characters' identities such as a conversion from ASCII to facsimile-compatible format, so as to allow transmission to a remote facsimile machine through modem 33 without the need for activating facsimile 34.

Printer/display 24 are means for monitoring the progress of character recognition processing as well as for outputting and forming a permanent record for any of the character recognition steps. Keyboard 15 provides operator control over the operations of the FIG. 3 apparatus.

Figure 4:
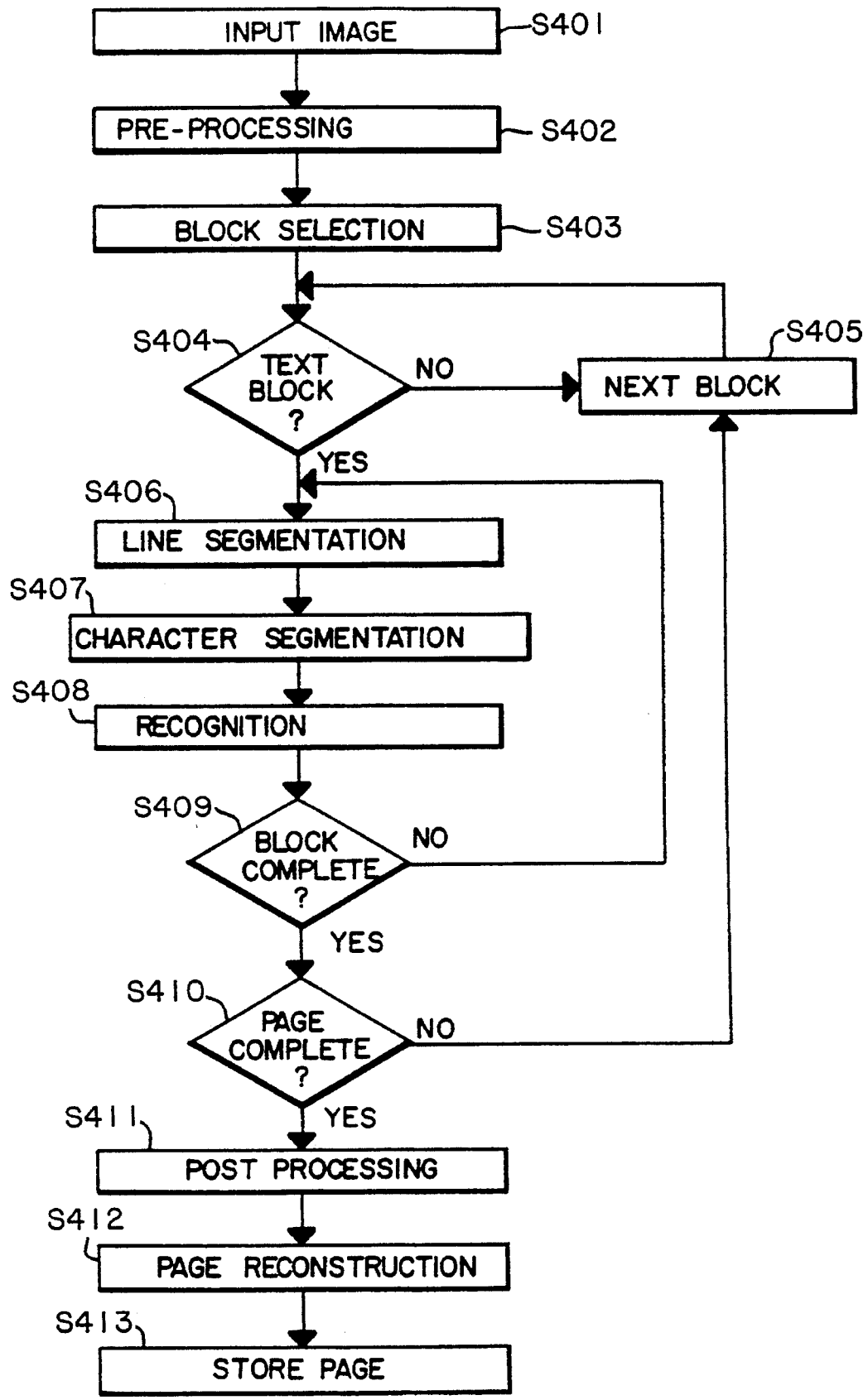
FIG. 4 is a generalized flowchart depicting how the block selection features of the present invention may be incorporated into a process for character recognition.

FIG. 4 is a flow chart showing general character recognition processing which will be helpful in understanding one way in which the block selection techniques according to the invention may be used advantageously. The process steps shown in FIG. 4 are executed by CPU 30 in accordance with a computer program stored in program ROM 35.

In step S401, pixel image data is input into the apparatus and is stored in RAM 32. Image data is a pixel-by-pixel representation of the image. Preferably, the pixel data is binary pixel data, that is, black and white image data. But it is possible for the image data to be half-tone image data in which each pixel is represented by one of a plurality of grey scale levels, or for the image data to be color image data in which each pixel is represented by a multibit word which encodes the color for the pixel. In such cases, or in any other case where the pixel data is not binary pixel data, threshold-processing should be performed so as to convert the non-binary pixel data into binary pixel data prior to storage in RAM 32.

Preferably, the pixel image data input in step S401 is representative of a portrait image, that is, an image which reads from the upper left hand corner to the lower right hand corner. If the image is not so configured, for example, if it is a landscape image, then the pixel image data may be translated so that it is representative of a portrait-type image. The translation may be performed in accordance with an operator-input instruction via keyboard 15 to translate the image data.

In step S402, the image data is pre-processed. Typically, a pre-processing filter is employed so as to enhance the image data, such as by improving degraded characters and images. A suitable image enhancement technique is described in co-pending application Ser. No. 07/771,220, filed Oct. 4, 1991, and assigned in common herewith.

If desired in step S402, the number of pixels in the pixel image data may be reduced, or compressed, so as to increase the speed of recognition processing at the possible cost of reduced accuracy. For example, it may be desired to average pixel values for an m×n block of pixels ("m" and "n" may be different) and to substitute a single pixel whose value is the average value for the m×n block.

In step S403, block selection is performed so as to characterize the type of image data in each segment of the image and to designate and identify blocks of information such as text information, graphics information, line image information, picture information, etc. In addition, the block selection of step S403 includes derivation of a hierarchical tree structure of the image so that the parts of the image may be reconstructed in the proper order as described in step S412 below. For example, the hierarchical tree structure includes information that permits two-column image data to be reconstructed with text from column 1 preceding text from column 2 so as to prevent text from column 1 reading across into text from column 2. Block selection according to step S403 is described more fully below.

A first block of information is selected from the image data stored in RAM 32 and step S404 determines whether it is a text block in accordance with the block identities determined in block selection step S403. If the first block is not a text block then flow proceeds to step S405 in which the next block is selected whereupon flow returns to step S404.

If in step S404 the block is a text block, then flow advances to step S406 in which the text block is subjected to line segmentation. In line segmentation, individual lines of text in the text block are segmented from other lines of text in the text block and the lines so segmented are serially processed as described more fully below.

In step S407, each character in a line is cut or segmented from other characters in the line so as to provide individual characters to the recognition processing routine, as described more fully below.

Recognition processing is performed for each character on a character-by-character basis in step S408 in which each character is compared by techniques known in the art to the standard characters stored in character dictionary 36. The entries in character dictionary 36 are ordinarily only for single characters, but because some character sequences are difficult to cut between (e.g., "fi") and because single characters are sometimes cut inadvertently (e.g., "j"), the character dictionary can contain other entries as well. Specifically, the dictionary may include entries for pairs of touching characters that are difficult to cut. Likewise, the character dictionary may contain entries for portions of characters that are frequently cut inadvertently.

On the basis of the comparison, an identity is selected for the character image and the character identity so selected is stored in RAM 32 or output to output device 21. Optionally, the identified character is also displayed on printer/display 24.

Step S409 determines whether processing for the text block is complete. If processing is not yet complete, flow returns to step S406 (or, if appropriate, to step S407) for further line segmentation or character segmentation processing. When block processing is complete, flow advances to step S410 which determines whether processing for a page is complete. If processing for the page is not yet complete, then flow returns to step S405 in which the next block on the page is selected for processing.

When processing for the page is complete, flow advances from step S410 to step S411 in which post-processing is performed. Post-processing includes such techniques as context-checking and spell-checking whereby the identities of characters recognized in recognition step S408 may be modified in accordance with the context in which those characters occur (a holistic viewpoint) rather than on an individual character basis as was the case in step S408.

In step S412, the image data is reconstructed in accordance with the hierarchical tree structure defined in the block selection step S403. Page reconstruction permits the image data to be placed in its proper order whereby, for example, footnotes are separated from the main text, columns follow other columns rather than being merged together, and graphic or line drawing data may be inserted into the appropriate locations in the recognized character text of the page. Captions associated with such graphics images or line drawings may be inserted adjacent to those drawings. Other rules may be applied, and, for example, it is possible that physical reconstruction of the page is not desired but rather only to extract the text from a page. Rules may be defined by a user for page reconstruction in accordance with the information processing capabilities of the apparatus.

In step S413, the reconstructed page is stored, for example, on output device 37. Information processing such as spreadsheet or word-processing may then be performed in accordance with other application programs stored in ROM 35 and executed by CPU 30. The processed information (or the unprocessed information, if desired) may then be retransmitted by any of various means, e.g., by facsimile 34, modem 35, or over ordinary voice telephone by a speech synthesis device which "speaks" the computer text file.

Figure 5:
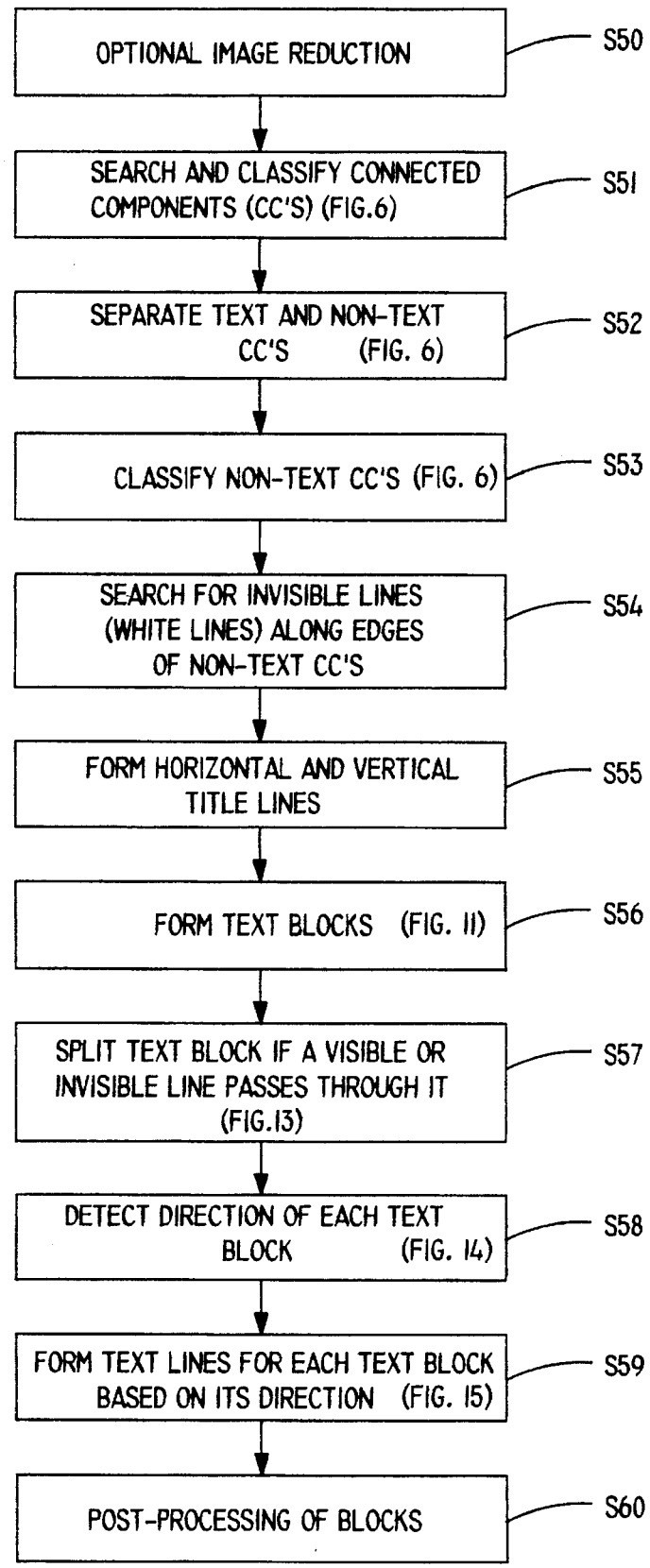
FIG. 5 is an overall flowchart of the block-selection technique according to the present invention.
Figure 6A:
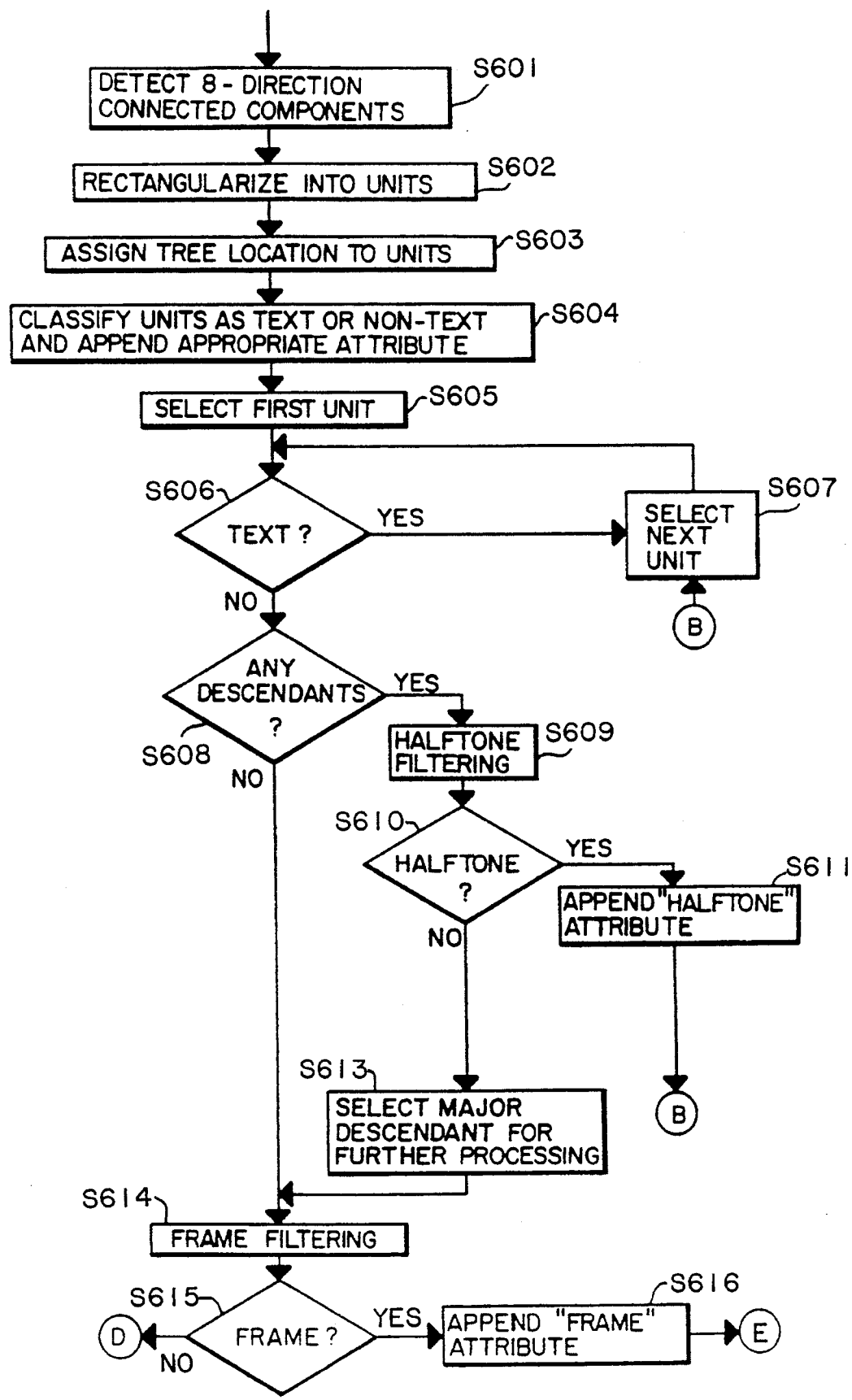
FIGS. 6A, 6B, 6C, and 6D is a flowchart depicting the details of steps S51–S53 in FIG. 5.
Figure 6B:
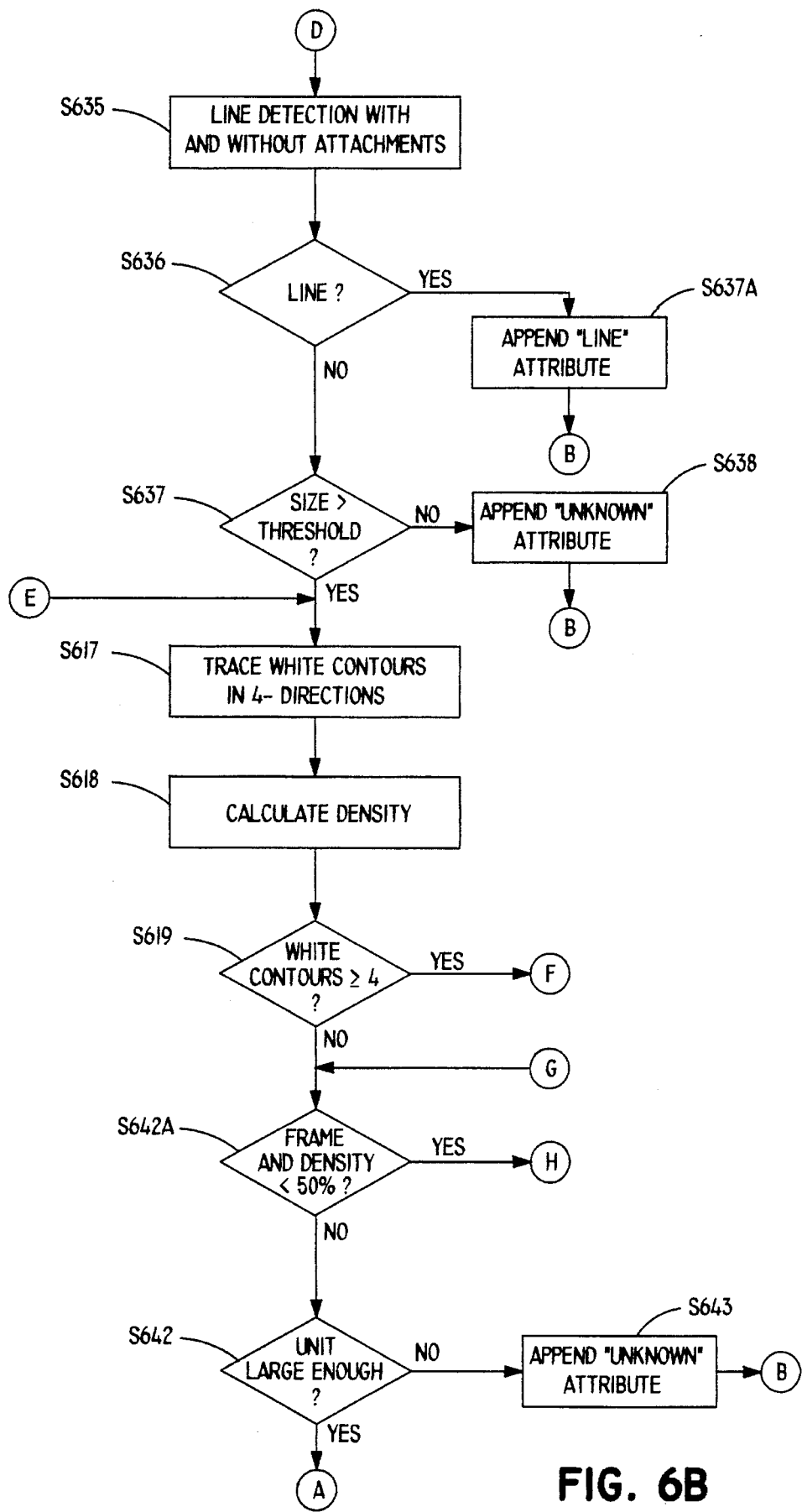
Figure 6C:
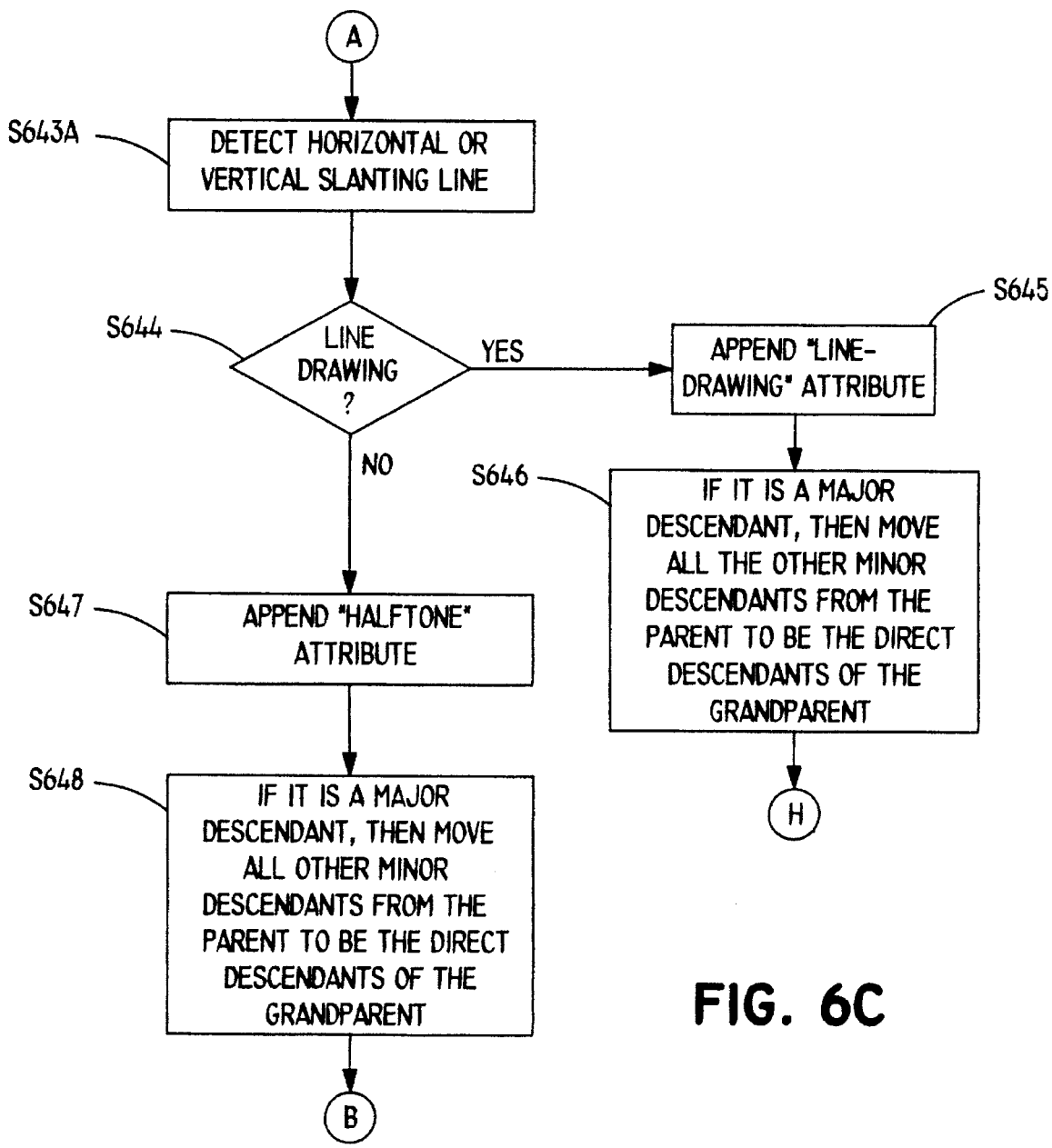
Figure 6D:
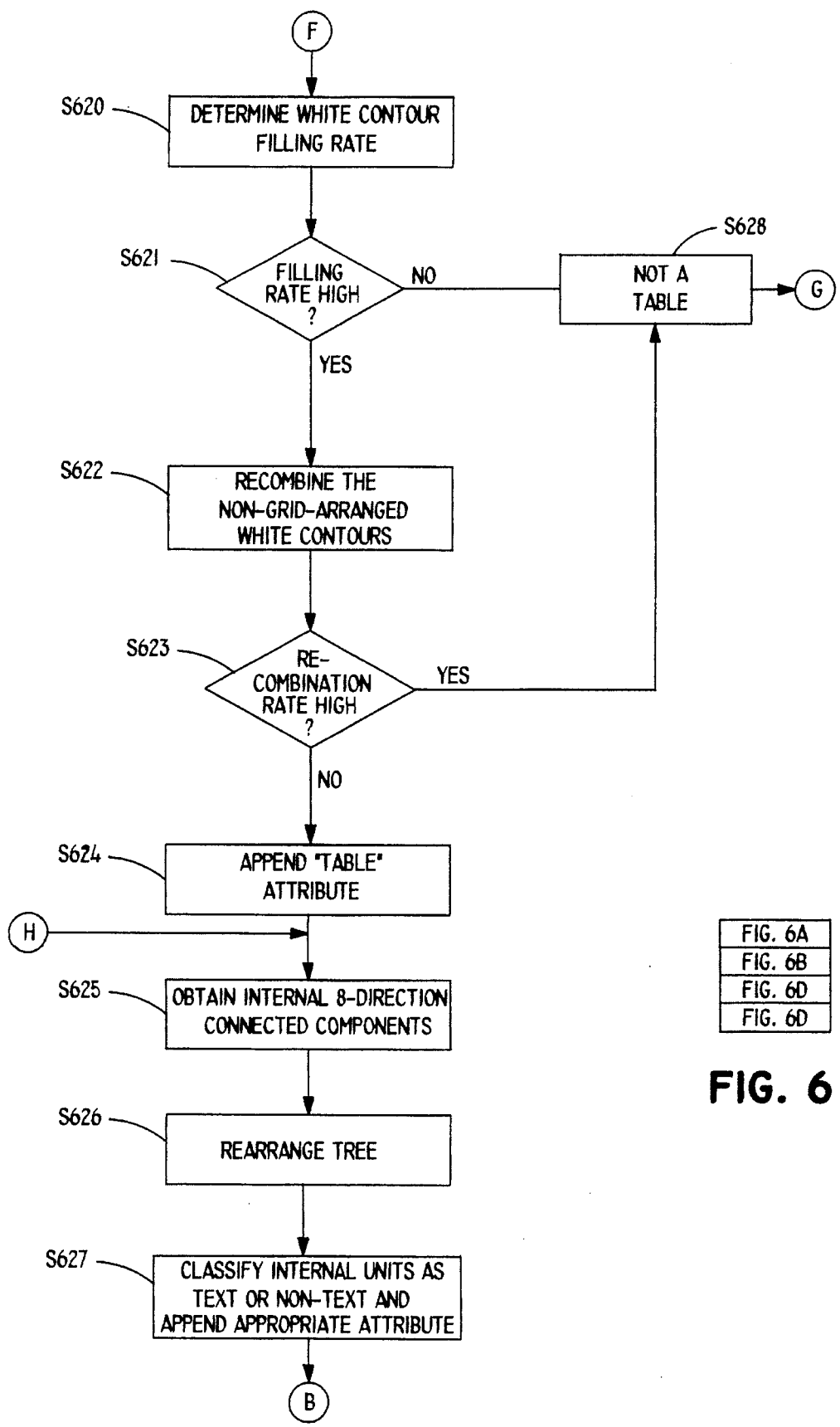

FIG. 5 is a generalized flow diagram for explaining block selection processing in step S403 in FIG. 4. It should be pointed out that block selection processing can be used apart from a character recognition system. For example, it is possible to use block selection processing in image reproducing equipment so as to cause a first method of image reproduction to be used for one type of block and a second method of image reproduction to be used for a second type of block; to use block selection processing in data compression schemes; etc.

In step S50, image enhancement and/or data reduction may be performed if it is desired to increase block selection processing speed. If image data reduction is performed, then block selection is performed on the reduced image. However, so as not to affect character recognition processing in the remainder of FIG. 4 (i.e., steps S404 through S413), at the end of block selection processing, the selected blocks are applied against the unreduced pixel image data.

Image data reduction proceeds by evaluating the connectivity of black pixels in m×m blocks of pixels. For example, if there are two connected black pixels in a 3×3 pixel block, then the 3×3 block is reduced to a single black pixel. Conversely, if there are not two connected black pixels in the 3×3 pixel block, the 3×3 block is reduced to a single white pixel. Preferably, black pixels in 4×4 blocks are evaluated. The principle is to keep the connectivity of the original image.

In step S51, the pixel image is analyzed to detect connected components and to classify the connected components in accordance with their size and their location relative to other connected components. A connected component is a group of black pixels that is completely surrounded by white pixels. Accordingly, a connected component is a group of black pixels that is separated completely from other groups of black pixels by at least one white pixel. As explained more fully below in connection with FIG. 6, step S51 involves detecting the connected components (connected in any of the eight directions surrounding each pixel). In step S52, based on size information and some statistical values obtained from the connected components (to be more fully described below), classifications are assigned to each connected component. As will be explained more fully below, each connected component is classified as either a text unit or a non-text unit. Non-text units are subjected to further analysis in step S53 to determine whether they are frame data, halftone images, line drawings, tables or other tabular organizations of text data, vertical lines, horizontal lines, vertical or horizontal slanted lines, based on their thickness or fullness, or if they are an unknown classification. A hierarchical tree structure is developed for each of the connected components so as to provide organizational data of the connected components and to facilitate reconstruction of the digital data as described above with respect to S412.

In step S54, invisible lines (white lines) are searched for along the edges of non-text connected components. The reason for using such invisible lines is that the distance between some text columns may be exceptionally narrower than the usual column gaps existing on the same page. The detection of such invisible lines will help in later determining whether adjacent text connected components should, in fact, be grouped in the same text block.

In step S55, any non-text units that could not be classified in step S51 are analyzed to determine whether they may be large font size titles. If they are determined to be titles, then the units are re-designated appropriately and the tree structure updated. Titles are of assistance in reconstructing the page in accordance with step S412. Title lines are formed in either a horizontal or vertical direction by grouping the unknown non-text and text components identified in steps S52 and S53 above. Before this grouping, the grouping direction is determined based on the distance between the components considered to be grouped and the possible title line length if the title is vertical or horizontal.

In step S56, text blocks are formed from the text connected components, as will be described more fully below. In step S57, a formed text block may be split if a visible or invisible line passes through it. The reason for using the lines is not only because of an extremely narrow column gap, but also because the distance between the text connected components of different blocks may become shortened enough in the skew case for the components to be grouped into one block, especially, when the invisible or visible lines are the separators between them.

In step S58, the direction of each text block is detected. Thus, according to the present invention, no skew detection or image rotation is performed before the text blocks are formed. Thus, unlike most block selection algorithms, the present invention directly forms text blocks on the page image without applying any skew detection and image rotation operation beforehand. This saves the time consumed in image rotation and avoids inaccuracies due to skew detection. Furthermore, it is possible that some of the text areas of the same page are particularly edited in a slanted way to achieve some special visual effect. In such a case, skew detection and image rotation may not help the situation for correcting the page image into an upright style. Thus, according to the present invention, the text and non text blocks are directly searched for without regard to the skew of the scanned page. After the text blocks are formed, the direction of the skew of each text block can then be individually identified.

In step S59, the text lines for each text block are formed based on the direction of the text block. In step S60, post-processing is performed to make the text and non-text block representation more compact and cleaner. For example, previous block-selection algorithms produced text blocks which were represented by a rectangle. However, such rectangles may obscure the separation of text blocks in the case of a skewed document. In order to emphasize the separation among the text blocks if their rectangular areas overlap, the present invention provides an irregularly-shaped curve to enclose each text block more compactly. This enclosed curve is useful not only for enhancing the displaying effect, but also for extracting the block image. The irregularly-shaped curve enclosing the text block may also be generated in the text block formation step S56 whenever a text block is newly created or updated.

FIG. 6, comprising FIGS. 6A, 6B, 6C, and 6D is a detailed flow chart for showing how connected components of pixel image data are detected and how those connected components are classified, i.e., steps S51–53 discussed above. The process steps shown in FIG. 6 are executed by CPU 30 in accordance with program steps stored in program ROM 35.

In step S601, the connected components in the pixel image data are detected by contour tracing. Contour tracing proceeds by scanning the image data as shown in FIG. 7A. Scanning proceeds from the lower right hand portion of the image to the left as shown by arrow A and proceeds upwardly when the right hand border of the image has been encountered. Scanning may also proceed in other directions, for example, from upper left toward lower right. When a blackened pixel is encountered, adjacent pixels are inspected in the order shown in the starburst-like pattern shown at 71 to determine if a pixel adjacent the blackened pixel is also black. Because the starburst-like pattern 71 includes eight numbered vectors emanating from a common center, this contour tracing is hereinafter referred to as "8-direction" tracing. If an adjacent blackened pixel is located, processing proceeds as mentioned above until the exterior contour of the image has been traced. Thus, as shown in FIG. 7B, scanning in the direction of arrow A has located point 72 which corresponds to the tail of letter "Q". Inspection of adjacent pixels proceeds in accordance with the starburst-like pattern 71 so that the exterior contour of the letter "Q" is traced. The interior portions of closed contours are not traced.

After one connected component is detected, and the contour thereof traced by 8-direction tracing, scanning advances until the next blackened pixel is located. Thus, for example, object 74 which may represent a completely blackened area is 8-direction traced. Similarly, non-text object 75, which is a handwritten word "non-text" is traced as are the individual letters in text objects 76 which are individual characters forming the word "text". Scanning shown in FIG. 7A continues until all connected components in the pixel data have been detected and the contours thereof 8-direction detected.

Flow then advances to step S602 in which each connected component is rectangularized. Specifically, the smallest possible circumscribing rectangle is drawn around each connected component. Thus, as shown in FIG. 7B, a rectangle 77 is drawn around object 72, a rectangle 79 is drawn around object 74, a rectangle 80 is drawn around object 75, and rectangles 81a, 81b, 81c and 81d are drawn around text objects 76a, 76b, 76c and 76d, respectively.

In step S603, a tree location is assigned to each rectangular unit. For the most part, the tree structure obtained in step S603 proceeds directly from the root of the tree for each object in the pixel image. This is because only the exterior contours of connected components are traced and interior portions of closed contours are not traced. Thus, as shown in FIG. 7C, rectangle 77 which corresponds to connected component 72 proceeds directly from the root of the page. However, for those connected components whose rectangles lie entirely within the rectangle of another connected component, such as rectangle 80 which corresponds to non-text object 75 and rectangles 81a and 81b which correspond to text objects 76a and 76b, those connected components are designated as descendants from the enclosing connecting component (in this case component 74). In addition, for each connected component with at least one descendent, such as component 74, the component itself is designated as a "major descendant" from itself. Thus, as shown in FIG. 7c, component 79 is included as a major descendant among the other descendants 80, 81a and 81b of component 79.

In step S604, each connected component at the first level on the tree is classified as either a text unit or a non-text unit. Classification proceeds in two steps. In the first step, the rectangle for the connected component is compared to predetermined size thresholds. If the height and width of the rectangle enclosing the connected component is higher than a first predetermined threshold that corresponds to the maximum expected font size, then the connected component is classified as a non-text unit and a "non-text" attribute is appended to the unit.

In the second step, all remaining units, that is, units not yet classified as non-text, are compared to thresholds that are determined adaptively based on the collective sizes of all remaining connected components. Specifically, the larger of the regular text size (12 pt) and the medium size (the smaller of the medium height and the medium width) of all rectangles not yet designated as non-text are chosen. The chosen values are multiplied by a scaler (conveniently selected as "1.5") to obtained adaptively determined thresholds for both height and width. Any unit larger than all of the determined thresholds is presumed to be non-text and is classified accordingly, while any unit smaller than any of the adaptively determined thresholds and meeting predetermined text characteristics is presumed to be text. The units are classified accordingly and the appropriate attribute is appended. Both of these classifications are subject to refinement as set forth in the remainder of FIG. 6 and as described more fully below.

After each unit in the first level of the tree has been classified as text or non-text, all descendants of text units, including major descendants, are classified as text units. The classification of major descendants of non-text units is retained as non-text, but all other descendants of non-text units are classified as text units.

In step S605, the first unit is selected. If, in step S606, the unit is a text unit then flow advances to step S607 where the next unit is selected. Flow continues through steps S606 and S607 until a non-text unit is selected, whereupon flow advances to step S608.

In step S608, the non-text unit is inspected to determine whether there are any descendants from the unit. For example, as shown in FIG. 7C, non-text unit 79 includes non-text major descendant 79 and text descendants 80, 81a and 81b.

If, in step S608 there are any descendants, then flow advances to step S609 where the unit is filtered to determine if the unit is a halftone (or grey-scale) unit. In halftone filtering, the descendants of the unit are inspected, and the number of descendants whose size is less than a "noise" size is determined. A "noise-sized" unit is a unit whose height and width is less than the smallest font size expected for the image data. If the number of descendants that are sized less than a noise size is greater than half of the total number of descendants, then the unit is determined to be a halftone image. Accordingly, in step S610, flow advances to step S611, wherein a "halftone" attribute is appended to the unit. Flow then returns to step S607 in which the next unit is selected for processing.

If in step S609 halftone filtering determines that the unit is not a halftone image, then flow advances through step S610 into step S613 in which the major descendant from the unit is selected for further processing. Flow then advances to step S614.

If in step S608 the non-text unit is determined not to have any descendants, or if in step S613 the major descendant has been selected for further processing, then in step S614 the unit in question is subjected to frame filtering. Frame filtering is designed to determine whether the unit in question is a frame and involves detection of parallel horizontal lines and parallel vertical lines that are approximately the same width and/or height as the rectangle which circumscribes the unit. In particular, the connected component is inspected to determine, for each row in the pixel, the longest distance spanning the interior portion of the connected component in the unit. Thus, as shown in FIG. 8A, non-text unit 82 includes connected component 83, the contour of which has been traced by 8-direction tracing as shown at 84. For row "i" the longest distance spanning the interior of the connected component is distance $x_i$ which is the distance from the left most border 85a of the contour to the right most border 85b. On the other hand, for row "j" there are two distances which span the interior of the connected component; the distance between points 86a and 86b on the border of the connected component and the distance between points 87a and 87b. Because the distance between points 86a and 86b is larger between the distance between points 87a and 87b, distance $x_j$ is the longest distance spanning the interior of the connected component for row j.

For each of the n rows in non-text unit 82 an "x" distance is derived and the following inequality is tested to determine whether the nontext unit is a frame:

$$\sum_{k=1}^{N} \frac{(X_k - W)^2}{N} < \text{threshold}$$

where $X_k$ is the longest distance spanning the interior of the connected component for the kth row (as described above), W is the width of the rectangular unit 82, N is the number of rows, and the threshold is pre-calculated so as to permit the detection of frames even if the frames are skewed or slanted in the image data. To permit a 1° skew or slant angle, a threshold of sin(1°) times L plus an offset which equals the average text height calculated in step S604 has been found to yield satisfactory results.

If the above inequality is satisfied, then the unit is determined to be frame data, and flow advances through step S615 to step S616 in which a "frame" attribute is appended to the unit.

After step S616, flow then advances to consider the possibility that the framed data includes table or tabularly organized data. Thus, in step S617 (FIG. 6B), the interior of the connected component is inspected to obtain white contours.

White contours are similar to the contours detected in step S601 above, but white pixels are inspected rather than black pixels. Thus, as shown in FIG. 9A, the interior of a non-text unit is scanned in the direction of arrow B from the bottom right hand portion of the interior of the non-text unit toward the upper left hand portion. When a first white pixel is encountered, adjacent pixels to the white pixel are inspected in the order shown in the starburst-like pattern 91. It is noted that the starburst-like pattern 91 includes numbered vectors numbered from 1 through 4. Accordingly, white contour tracing according to this step is hereinafter designated as "4-direction" white contour tracing. White contour tracing is continued in the 4-directions until all white contours enclosed by black pixels are traced. For example, white contour tracing follows pixels forming the interior contour of black pixel segments 92, 93, 94 and 95 as well as any other black pixels within the interior such as the black pixels designated generally at 96. After each white contour is located, scanning proceeds as above in the direction of arrow B until all white contours enclosed in the non-text object have been traced.

In step S618, the density of the non-text unit is calculated. Density is calculated by counting the number of black pixels within the connected component, and dividing the number of black pixels by the total number of pixels enclosed by the rectangle.

In step S619, the number of white contours found within the non-text unit are inspected. If the number of white contours is greater than or equal to 4, then there is a possibility that the non-text image is in fact a table or tabularly arranged series of text blocks. Accordingly, in step S620 (FIG. 6D), the white contour filling rate is determined. The white contour filling rate is the degree to which white contours fill the area enclosed by the non-text image. Thus, as shown in FIG. 9A, the white contour filling rate includes cross-hatched areas such as 97 and 99 which are completely empty white spaces, as well as areas such as 100 and 101 which are white spaces in which black pixels are located. If the filling rate is high, then it is probable that the non-text image is a table or tabularly arranged sequence of text data. Accordingly, in step S621, the filling rate is inspected. If the filling rate is high, then it is probable that the non-text image is a table or tabularly arranged sequence of text data. To increase the confidence in this determination, the white contours are inspected to determine if they form a grid-like structure extending both horizontally and vertically. Specifically, in step S622 non-grid-arranged white contours are recombined if their boundaries do not extend horizontally and vertically across at least two contours. For example, as shown in FIG. 9A, the left boundary 102 and right boundary 103 of white contour 99 extend vertically so as to coincide with the left boundary 104 and the right boundary 105 of white contour 100. Accordingly, since these white contours are arranged in a grid structure, these white contours are not recombined. Similarly, the upper boundary 106 and the lower boundary 107 of white contour 103 extend horizontally so as to coincide with the upper boundary 108 and lower boundary 109 of white contour 110. Accordingly, since these white contours are arranged in a grid-like structure, these white contours are not recombined.

FIGS. 9B through 9C are figures for explaining a situation in which white contours are recombined. FIG. 9B shows a non-text unit 111 which may, for example, be formed through thresholding of a halftone image into a binary image as described above with respect to step S401. The non-text image 111 includes black area 112 as well as white areas 114, 115, 116, 117, 118 and 119. Presumably, the filling rate of these white areas is sufficiently high so that in step S621 flow has advanced to recombination step S622. First, as shown in FIG. 9B, the upper and lower boundaries of white contour 115 are compared with the upper and lower boundaries of white contour 117. Since these upper and lower boundaries do not coincide, white contour 115 is combined with white contour 116, as shown in FIG. 9C, to create combined white contour 116'.

In FIG. 9C, the left and right boundaries of white contour 117 are compared to the left and right boundaries of white contour 118. Since these boundaries are not the same, white contours 117 and 119 are recombined into a single white contour 117', as shown in FIG. 9D.

The process is repeated horizontally and vertically until no more recombinations occur.

Thus, as explained above, white contours for a table are not likely to recombine, whereas white contours for a non-table, for example, a halftone image or a line drawing, are more likely to recombine. Accordingly, in step S623, the recombination rate is inspected. If the recombination rate is high or if the filling rate was low in step S621, then it is likely that the non-text framed unit is a slanted line, an unknown, a halftone image or a line drawing, and flow advances to step S628 in which the non-text unit is designated as not a table, and flow advances to step S642A (FIG. 6B) as will be described below.

If in step S623 the recombination rate is not high, then flow advances to step S624 in which the non-text image is designated as a "table". In step S625, the interior of the newly-designated table is inspected so as to detect and classify connected components in 8-directions. In step S626, the hierarchical structure is updated in accordance with the new, internal connected components. In step S627, the internal connected components are re-classified as text or non-text and the appropriate attribute is appended, as set forth above with respect to step S602 through step S604. After step S627, the non-text connected components inside a table may be further classified as line-drawing pictures, halftone pictures, or unknowns based on size, density, etc.; the non-text connected components inside a frame and those inside a line-drawing picture may be further classified as discussed above with respect to steps S608 et seq. Flow thereupon returns to step S607 in which the next unit is selected.

Reverting to steps S621 and S623, if in step S621, the filling rate is not high, or if in step S623, the recombination rate is high, then it is likely that the non-text framed unit is a slanted line, an unknown, a halftone image or a line drawing, i.e., not a table.

Reverting to step S619, if the number of white contours is not greater than 4, then the framed unit is not considered to be a table. Accordingly, flow advances to step S642A in which it is determined whether the frame and density are less than a threshold equal to about 0.5. The threshold is selected based on the expectation that text units or line drawings inside a frame should occupy less than half the pixels. If the frame and density are less than the threshold, then flow returns to steps S625–S627 as set forth hereinabove, and thereafter, flow reverts back to step S607 for the selection of the next unit.

If in step S642A, the frame and density are not less than the predetermined threshold then flow advances to step S642 for a determination as to whether the framed unit can be classified as a line drawing or as a halftone image, or whether the frame cannot be classified (i.e., the frame is "unknown"), as will be described more fully below.

Reverting to step S615 (FIG. 6A), if frame filtering in step S614 does not detect a frame within the non-text unit, then flow advances to step S635 (FIG. 6B) to determine whether the non-text unit includes a line. Lines are useful non-text units for delineating text boundaries. But because text that is bounded by such lines often appears in close proximity to the lines, it is possible for the text to become attached to the line. Accordingly, line detection is designed to detect lines both with and without text attachments.

To detect a line without attachments, a histogram of the non-text unit is calculated in the lengthwise direction of the unit. As shown in FIG. 8B, the histogram 88 of a line should show a fairly uniform distribution whose height is approximately equal to the width of the line. The width of the line is approximately equal to the width ("W") of the non-text unit; any difference is due to a slant angle $\theta_s$ which results if the original document is skewed when the pixel image is formed. Accordingly, to determine whether the non-text unit contains a line, the height 89 of each $cell_k$ in the histogram is compared with the width W of the non-text unit. The root mean square difference between these values is compared with a threshold as follows:

$$\sum_{k=1}^{N} \frac{(cell_k - W)^2}{N} < \text{threshold}$$

The threshold is calculated to permit a skew or a slant $\theta_s$ of the line within the non-text unit. For a 1° skew or slant, a threshold of $$\sum_{k=1}^{N} \left[ \frac{k \sin(1°)}{N} \right]^2$$

has been found to yield satisfactory results.

If a line without attachments is not found in accordance with the above inequality, then a determination is made as to whether the unit includes a line with attachments. To determine whether a line with attachments is included in the non-text unit, the text unit is inspected to determine whether a line extends lengthwise along the border of the unit. Specifically, if a line extends lengthwise through the unit then the border of the rectangle circumscribing the unit will lie very close to the line, as shown in FIG. 8C. Accordingly, the uniformity with which the first black pixels lie within the border of the rectangle is inspected by calculating the sum of the squares of the distance in from the border. Thus, referring to FIG. 8C, the following inequality is tested:

$$\sum_{k=1}^{N} \frac{X_k^2}{N} < \text{threshold}$$

If the sum of the squares is less than the predetermined threshold then a line unit with attachments is found. The same threshold as that given above for lines without attachments has been found to yield satisfactory results.

If in step S635 a line is detected, then flow advances through step S636 to step S637A where a "line" attribute is appended to the non-text unit. Flow then returns to step S607 (FIG. 6A) in which the next unit is selected.

On the other hand, if a line is not detected in step S635, then flow advances through step S636 to step S637 in which the size of the non-text unit is inspected. If the size is not greater than a predetermined threshold, then the classification of the non-text unit cannot be determined. The threshold is set in dependence on the maximum font size and the document type (horizontal, vertical, or mixed); half the maximum font size yields satisfactory results. Accordingly, flow advances to step S638 in which a "unknown" attribute is appended to the non-text unit whereupon flow returns to step S607 (FIG. 6A) where the next unit is selected.

If in step S637 the size is greater than a predetermined threshold, then flow advances to steps S617, S618 and S619 in which the internal white contours of the non-text unit are traced, the density of the non-text unit is calculated, and the number of white contours is inspected, as set forth above.

If in step S619, the number of white contours is not greater than or equal to 4, then flow advances to steps S642A and S642, as discussed above. In step S642 where the size of the unit is calculated to determine whether it is large enough to constitute either a line drawing or a halftone image. This size determination is based on the height and width of the non-text unit, the document type, as well as the maximum run length of black pixels. For example, if the non-text unit's height and width are not greater than the maximum font size, then the non-text unit is not large enough to be either a halftone image or a line drawing, and flow advances to step S643 where an "unknown" attribute is appended. Likewise, if although the non-text unit's width is greater than the maximum font size but the maximum run length of black pixels is also not greater than maximum font size, then flow advances to step S643 in which the "unknown" attribute is appended. Flow thereupon returns to step S607 (FIG. 6A) where a new unit is selected.

If in step S642 the non-text unit is large enough to be either a line drawing or a halftone image, then flow advances to step S643A where it is determined whether the non-text unit is a horizontal or vertical slanted line. Thereafter, flow proceeds to step S644 which determines whether the non-text unit is a line drawing or a halftone image. Whether the unit is classified as a halftone image or as a line drawing is determined based on the average horizontal run length of black pixels in the unit, the average horizontal run length of white pixels in the unit, the ratio between white and black pixels, and the density. In general, very dark images are considered to be halftone images while light images are considered to be line drawings.

Specifically, if the average run length of white pixels is approximately equal to zero (i.e., a predominantly dark or speckled image), then if the density as calculated in step S618 indicates that the unit is more black than white (i.e., the density is greater than a first threshold equal to about ½), and most rows contain long black run lengths, then the framed unit is determined to be a halftone. If the density is not greater than the first threshold, then the unit is determined to be a line drawing.

If the average run length of white pixels is not approximately equal to zero and if the average run length of white pixels is greater than the average run length of black pixels, and most rows do not contain the long black run lengths, then the framed unit is determined to be a line drawing. But if the average run length of white pixels is not greater than the average run length of black pixels (i.e., that is, again, a predominantly dark image) then further testing is needed.

Specifically, if the number of black pixels is much less than the number of white pixels (i.e., the number of black pixels divided by the number of white pixels is greater than a second threshold equal to about 2), then the framed unit is determined to be a halftone unit. On the other hand, if the number of black pixels divided by the number of white pixels is not greater than the second threshold, but the density determined in step S618 is greater than the first threshold, then the unit is determined to be a halftone image. Otherwise, the unit is determined to be a line drawing.

Accordingly, if in step S644 the unit is determined to be a line drawing, then flow advances to step S645 in which a "line drawing" attribute is appended and thence to step S646 in which all descendants are moved from the current parent to be direct descendants of the grandparent. Specifically, once a unit has been determined to be a line drawing, then no blocks are selected from the line drawing unit for possible character recognition. Thereafter, flow returns to steps S625, S626, and S627 and thereafter to step S607 in which the next unit is selected.

On the other hand, if in step S644 the unit is not determined to be a line drawing, then flow advances to step S647 in which a "halftone" attribute is appended and thence to step S648 in which all descendants are moved from the current parent to be direct descendants of the grandparent. Flow then returns to step S607 in which the next unit is selected.

In addition to the above-discussed non-text units determined above, the present invention also identifies slanted vertical lines and horizontal lines based on their thickness and fullness. A detailed flowchart showing such determination is omitted for purposes of clarity, but reference may be made to the appendix of computer program listings.

Two additional functions may be incorporated into step S53. Specifically, a splitting line attachment function may be carried out where text characters may be split from underlying lines. A second function may also be carried out wherein the existence of a dotted line, a broken line, or some decorated line may be detected (either straight or slanted).

The function of splitting a line attachment may be incorporated where the text (or some other text-size attachment) appears to be attached onto some non-text component (such as a vertical line, a horizontal line, a frame, etc.). For example, where the text characters appear to be embedded in an underlying horizontal line, it is necessary to split the text characters from the line so that the text characters may be characterized as text connected components, while the line pixels will be detected as non-text connected components.

The method for splitting the attachment between the text and the line may be carried out by first detecting the existence of such an attachment. In the case of a line, if one side edge of the line is determined to be smooth, but the other side of the line is determined not to be smooth, then some attachment exist on the non-smooth side. In the case of a frame, if some of the outer edges are not smooth, then some attachment to those frame edges may also exist.

Next, the two end points of the attached line (or edge of the frame) are calculated, where the position of the two end points is based on the image outline of the non-smooth side. A "cut" is then made which passes through the two calculated end points, and the attachment will be separated from the line along the "cut". The attachment is then separated from the line along the "cut" and the attachment and line may then be processed separately to determine whether the attachment connected components are text connected components or non-text components, although in the preferred form, the split attachment is classified as a text connected component.

The function for detecting the existence of dotted lines, broken lines, or decorated lines may be carried out by giving each detected line an attribute of either a vertical line, a horizontal line or a slanted line. To detect such non-continuous lines, the text connected components having small horizontal and/or vertical size (similar to the size of a period) are collected. Next, the collected components are divided into different groups based on their relative distances. Each group is then checked to determine if its size qualifies it to be a horizontal, vertical, or slanted line. If not qualified, it is checked whether the group is qualified as a dotted line or not. If it is determined that the size of the considered group is qualified to be a line, the groups are reorganized based on the size and the cleanliness of the gaps between the groups. Thereafter, the group is again checked to see if it is qualified as a dotted line.

If the group's width is similar to a vertical line, and if there is some vertical line neighboring the considered line, and the gap between this group and the line is clean, then it is determined that the considered group is qualified to be a vertical line. If it is not so qualified, it must be determined whether the group's length is similar to a horizontal line, and whether there is some neighboring horizontal line where the gap between the neighboring line and the considered line is clean. In this case, it is determined that the detected non-continuous line is a horizontal line.

Figure 10:
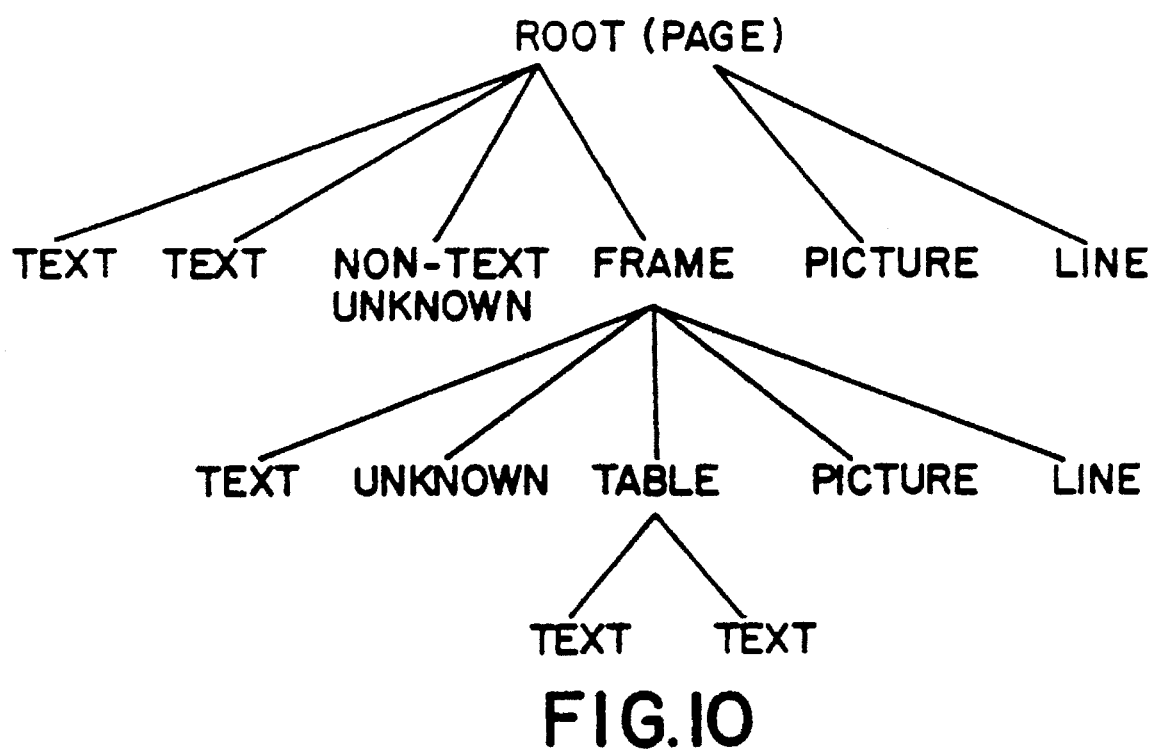
FIG. 10 is a schematic representation of the root or tree hierarchical structure for determining text and non-text characters, according to the present invention.

After all connected components in the pixel image have been detected and classified as described above with respect to FIG. 6 (step S53 in FIG. 5), a modified tree structure such as that shown in FIG. 10 is obtained. As shown there, the root of the tree corresponds to the page of pixel image data. Descending from the root are text blocks, non-text blocks whose contents are unknown, frames, pictures and lines. Descending from the frames are text blocks, unknown-non-text data, tables which in turn contain text blocks of pictures and lines.

Reverting to FIG. 5, after all of the non-text connected components have been classified in step S53, step S54 searches for invisible (white lines) along edges of the non-text connected components. Such invisible lines (together with invisible lines determined in step S52) will be used in step S57 to split text blocks if a visible or invisible line passes through that text block. This procedure will be described in detail later.

In step S55, horizontal and vertical title lines are formed using the unknown non-text connected components classified in step S53. These unknowns are used to detect the direction of the title which may be nominally vertical, horizontal, or slanted, based on the distance between the components considered to be grouped and the possible title line length if the title is horizontal or vertical. As with methods discussed above, each title connected component is compared with an immediately adjacent block in the horizontal and vertical directions, and whichever block is closer is appended to the horizontal or vertical title.

In step S56, the text connected components are used to form text blocks. Briefly, for each text connected component, the close horizontal and vertical neighbors are searched and grouped into text blocks in an aggregation process. This process will now be described in detail with respect to FIG. 11.

Figure 11:
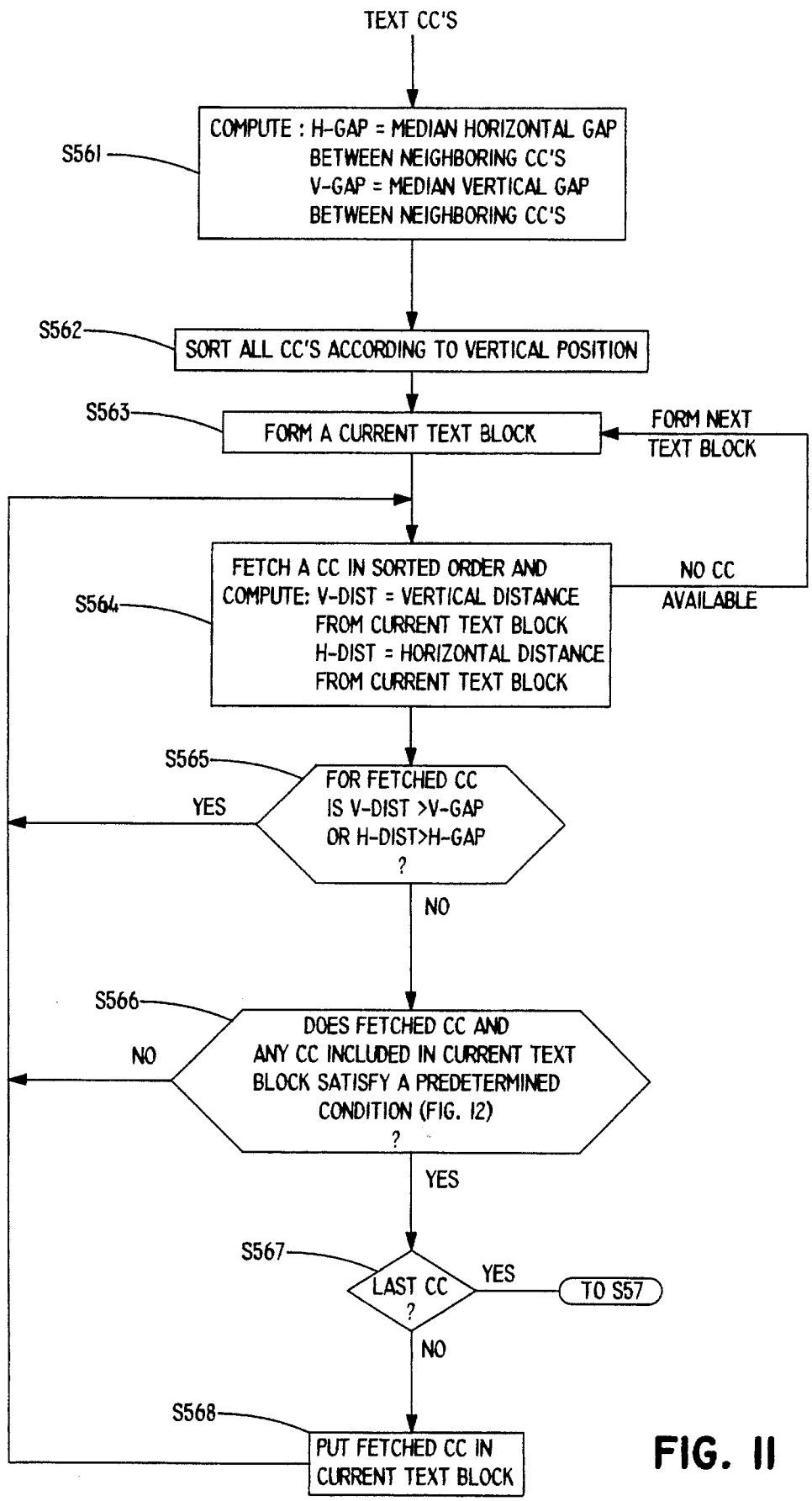
FIG. 11 is a flowchart for describing step S56 in FIG. 5.

In FIG. 11, the text connected components identified in step S52 are used, in step S561, to compute H_GAP and V_GAP. These are, respectively, the median horizontal and vertical gap between the neighboring text connected components. In step S562, all text connected components are then sorted by their vertical position. In step S563, the formation of a current text block is begun. In step S564, a connected component is fetched in the sort order and the values V_DIST and H_DIST are computed. These values are, respectively, the vertical and horizontal distance between the fetched connected component and the current text block. If there is no connected component available, the flow returns to step S563 and the next current text block is formed.

In step S565, it is determined whether, for the fetched connected component, V_DIST is greater than V_GAP or H_DIST is greater than H_GAP. If the answer to step S565 is YES, indicating that the fetched connected component should not be in the current text block, the flow returns to step S564 and the next connected component in the sort order is fetched. If, on the other hand, the answer to step S565 is NO, indicating that the fetched connected component may qualify for the current text block, flow proceeds to step S566.

In step S566, it is determined whether the fetched connected component and any connected component already included in the current text block satisfy a predetermined condition. In the preferred embodiment, the predetermined condition is set forth in FIG. 12.

Figure 12:
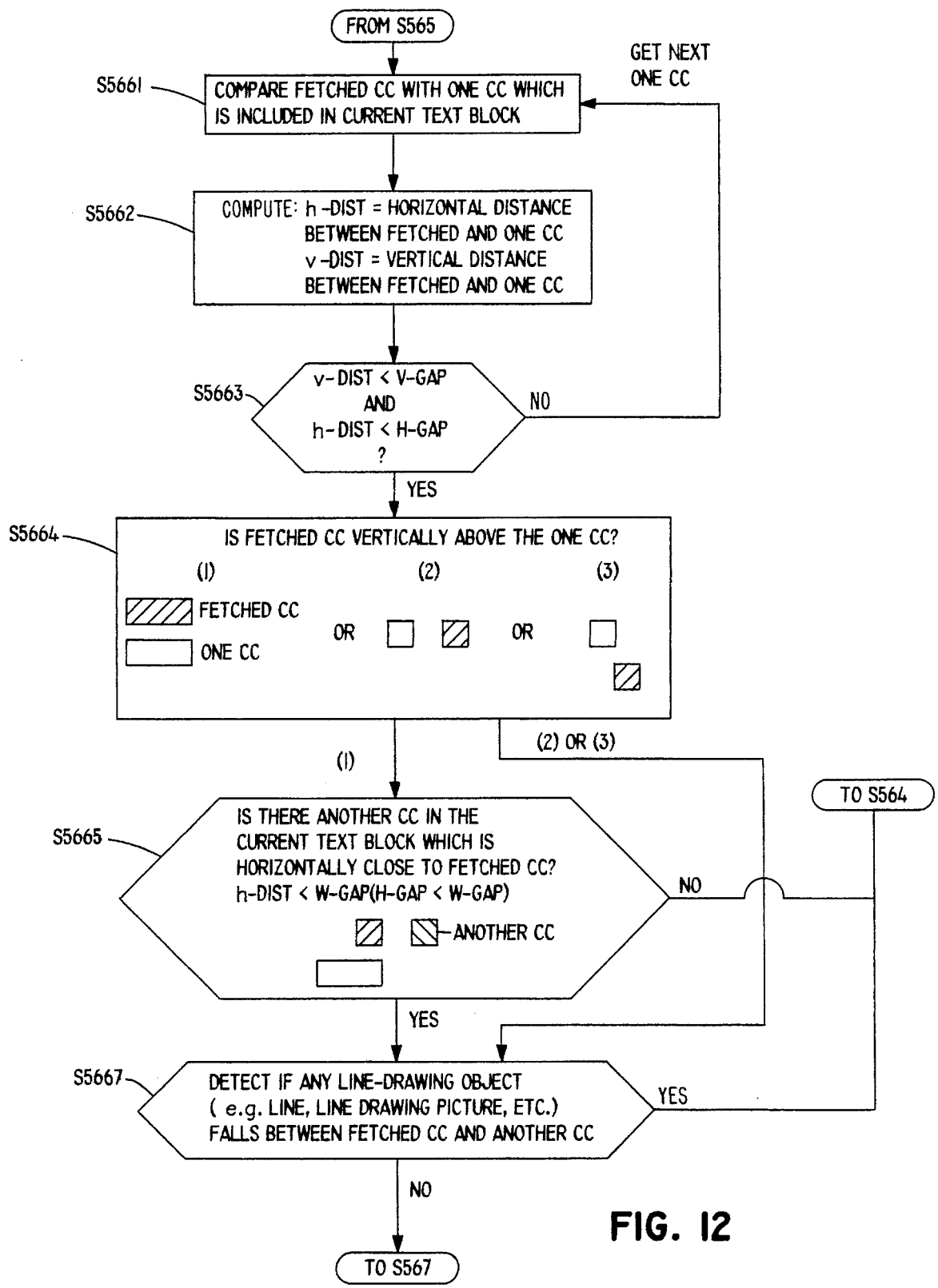
FIG. 12 is a flowchart for describing step S566 in FIG. 11.

In FIG. 12, step S5661 compares the fetched connected component with one connected component which is already included in the current text block. In step S5662, the values h_dist and v_dist are computed. These values respectively represent the horizontal and vertical distance between the fetched connected component and the one connected component identified in step S5661.

In step S5663, it is determined whether v_dist is less than V_GAP and whether h_dist is less than H_GAP. If the answer to step S5663 is NO, indicating that the one connected component identified in step S5661 is not close enough to the fetched connected component, the flow returns to step S5661 where the next one connected component in the current text box is compared with the fetched connected component.

If the answer to step S5663 is YES, flow proceeds to step S5664 where it is determined what type of vertical relationship the fetched connected component has with the one connected component. Three relationships are possible: (1) where the fetched connected component is vertically above the one connected component; and (2) where the fetched connected component is not above the one connected component. If condition (1) is met, flow proceeds to step S5665, whereas if conditions (2) or (3) are met, flow proceeds to step S5667.

In step S5665, it is determined whether there is another connected component in the current text block which is horizontally close to the fetched connected component. This is ascertained by determining whether h_dist is less than W_GAP (where W_GAP is a little bit wider than H_GAP). If the answer is NO, flow returns to step S5661 with the next one connected component in the current text block. However, if the answer to step S5665 is YES, flow proceeds to step S5667 where it is determined whether any line-drawing object (for example, a line, a line-drawing picture, etc.) falls between the fetched connected component and the another connected component identified in step S5665. If such a line-drawing object exist, flow returns to step S564 where the next connected component in part order is fetched. However, if the answer to step S5667 is NO, flow returns to step S567 in FIG. 11.

Reverting to FIG. 11, at step S567, it is determined whether the just-processed fetched component was the last text connected component identified in step S52. If the fetched connected component is not the last one, the fetched connected component is put into the current text block in step S568 and the flow returns to step S564 where the next connected component in sort order is fetched. If, on the other hand, the answer to step S567 is YES, the last fetched connected component has been put into the current text block, and flow returns to step S57 in FIG. 5.

Reverting to FIG. 5, step S57 determines whether a text block, formed in step S56, should be a single text block, or whether it should be divided into two or more text blocks due to a visible or invisible line passing through the formed text block. For example, FIG. 13A depicts a text block 131 having a plurality of connected components 132 disposed therein. Adjacent text block 131 are two non-text blocks 133 and 134. Between the non-text blocks is an invisible (white) line 135 identified in step S54. For example, if non-text blocks 133 and 134 each comprise a picture with invisible line 135 extending therebetween, the text connected components adjacent non-text block 133 may relate only to that non-text block, and the text connected components adjacent non-text block 134 may only relate to that non-text block. If the text block 131 formed in step S57 is a single text block, future character recognition processing may mischaracterize both of the non-text blocks 133 and 134.

As shown in FIG. 13B, in the situation where invisible line 135 (or a visible line) passes through the previously-formed text block 131, the text block is split into two text blocks 136 and 137. Now, the non-text blocks 133 and 134 will have their respective text connected components processed accordingly. After step S57, flow proceeds to step S58 where the direction of each text block is detected. The detection of the text block direction depends on the length and width of the text connected components in the text block, the vertical and horizontal gaps between the connected components and their relative location. FIG. 14, comprising FIGS. 14A and 14B, is a detailed flowchart describing this processing.

Figure 14A:
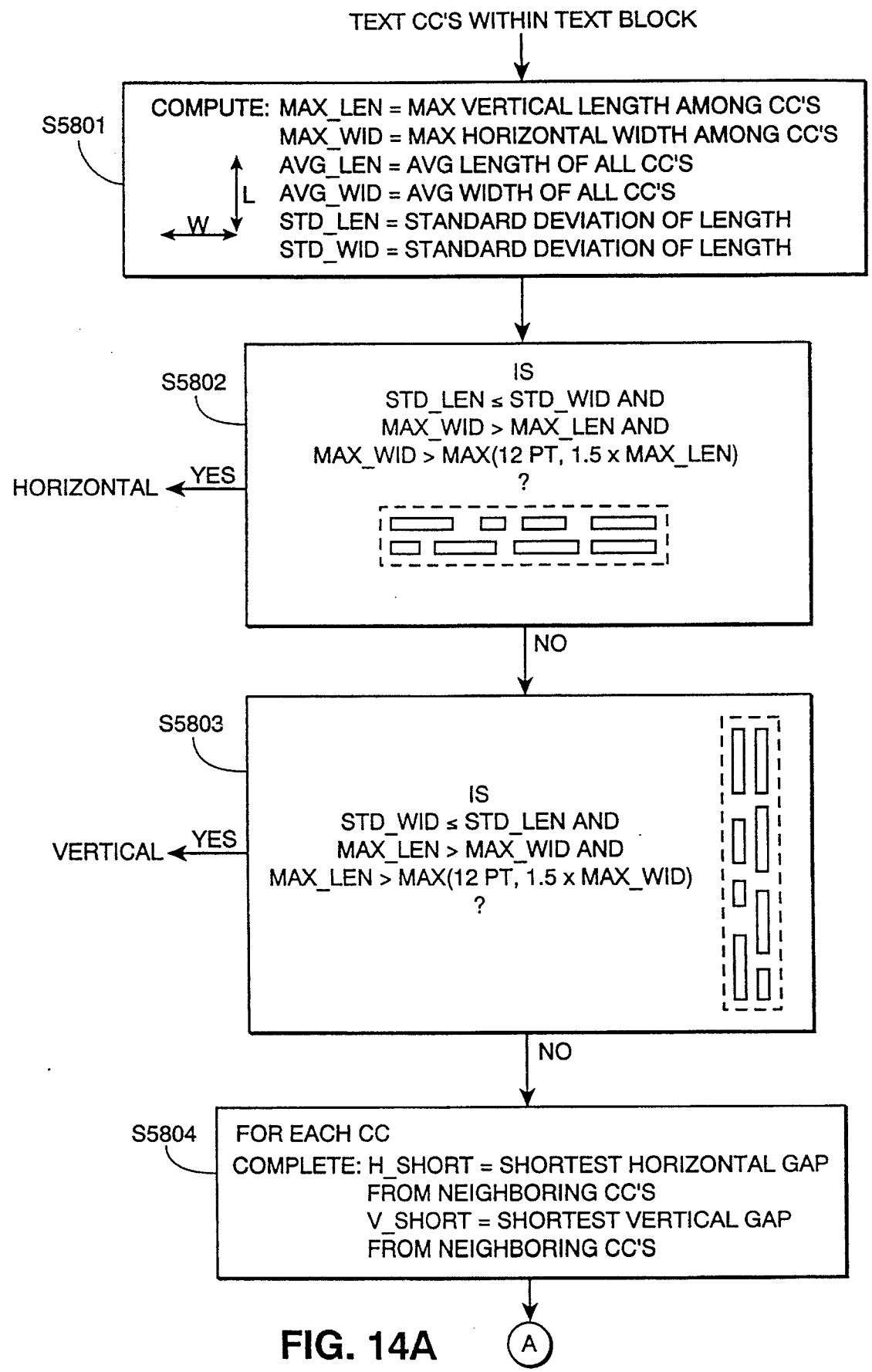
FIGS. 14A and 14B, is a flowchart for describing step S58 in FIG. 5.
Figures 14, 14A, 14B:
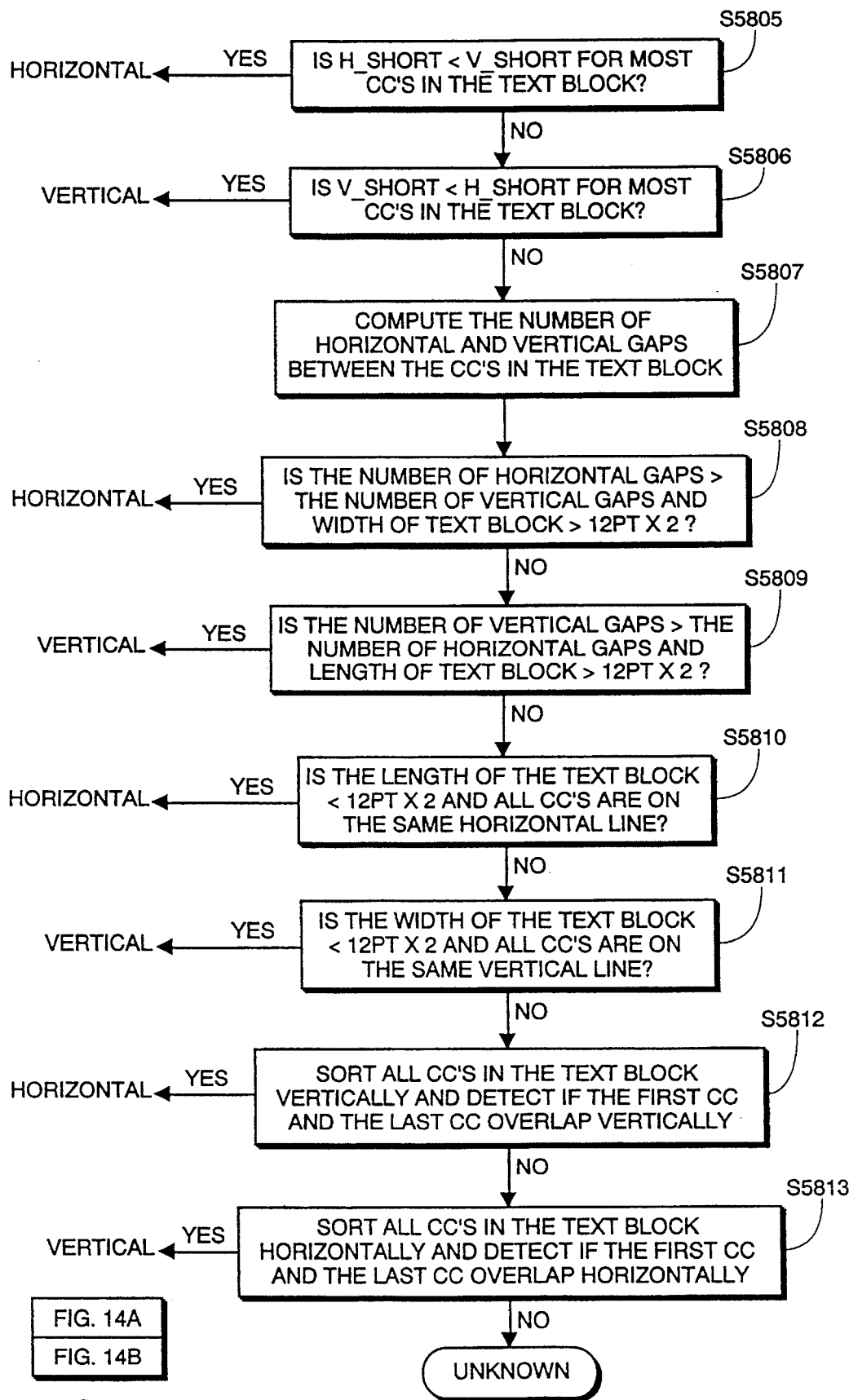
FIG. 14, comprising

In FIG. 14A, all text components within a text block formed in step S56 are first subject to step S5801 where a number of values are computed. It should be noted that the width refers to the horizontal dimension, whereas the length refers to the vertical dimension. The values MAX_LEN and MAX_WID are computed and respectively represent the maximum length and width among the text connected components within the text block. The values AVG_LEN and AVG_WID are also computed and represent, respectively, the average length and width of all the connected components within the text blocks. Finally, the values STD_LEN and STD_WID are computed and represent, respectively, the standard deviation of the length and the width of all the connected components within the text block.

Thereafter, a number of processing steps are taken to determine whether the text block is a horizontal text block or a vertical text block. Thus, at step S5802 it is determined whether STD_LEN is less than or equal to STD_WID, and MAX_WID is greater than MAX_LEN, and MAX_WID is greater than MAX (here determined to be 12 pt size print or 1.5×MAX_LEN; The 12 pt value is based on a normal text size. Of course, larger or smaller text sizes will require different values which may preferably be adjusted dynamically). If these relationships are true, it is determined that the text block is a horizontal text block. If these relationships are not true, flow proceeds to step S5803.

Step S5803 determines whether STD_WID is less than or equal to STD_LEN, and MAX_LEN is greater than MAX_WID, and MAX_LEN is greater than MAX (12 pt, or 1.5×MAX_WID). If these relationships are true, it is determined that the text block is a vertical text block. If these relationships are not true, flow proceeds to step S5804.

In step S5804, the values H_SHORT and V_SHORT are determined for each connected component. These values represent, respectively, the shortest horizontal and vertical gap from the each connected component and its neighboring connected components.

Flow then proceeds to step S5805 (FIG. 14B) where it is determined whether H_SHORT is less than V_SHORT for most of the connected components in the text block. If this relationship is true, it is determined that the text block is a horizontal text block. If this relationship is not true, flow proceeds to step S5806 where it is determined whether V_SHORT is less than H_SHORT for most of the connected components in the text block. If this relationship is true, it is determined that the text block is a vertical text block, but if the relationship is not true, flow proceeds to step S5807.

In step S5807, the number of horizontal and vertical gaps between the connected components in the text block is computed. Thereafter, step S508 determines whether the number of horizontal gaps is greater than the number of vertical gaps and the width of the text block is greater than 12 pt×2. If this relationship is true, it is determined that the text block is a horizontal text block, but if this relationship is not true, flow proceeds to step S5809. In step S5809, it is determined whether the number of vertical gaps is greater than the number of horizontal gaps, and the length of the text block is greater than 12 pt×2. If this relationship is true, it is determined that the text block is a vertical text block, but if this relationship is not true, flow proceeds to step S5810.

Step S5810 determines whether the length of the text block is less than 12 pt×2 and all of the connected components are on the same horizontal line. If this determination is true, then the text block is a horizontal text block, but if the determination is false, then flow proceeds to step S5811. In step S5811, it is determined whether the width of the text block is less than 12 pt×2 and all of the connected components are on the same vertical line. If this relationship is true, it is determined that the text block is a vertical text block, but if the relationship is not true, flow proceeds to step S5812.

In step S5812 all connected components in the text block are sorted vertically and it is detected whether the first connected component and the last connected component have vertical ranges which overlap. If they do overlap, it is determined that the text block is a horizontal text block, but if they do not overlap, flow proceeds to step S5813.

In step S5813, all of the connected components in the text block are sorted horizontally, and it is detected whether the first connected component and the last connected component have horizontal ranges which overlap. If they overlap, it is determined that the text block is a vertical text block, but if they do not overlap, it is determined that the direction of that text block is unknown.

Figure 15:
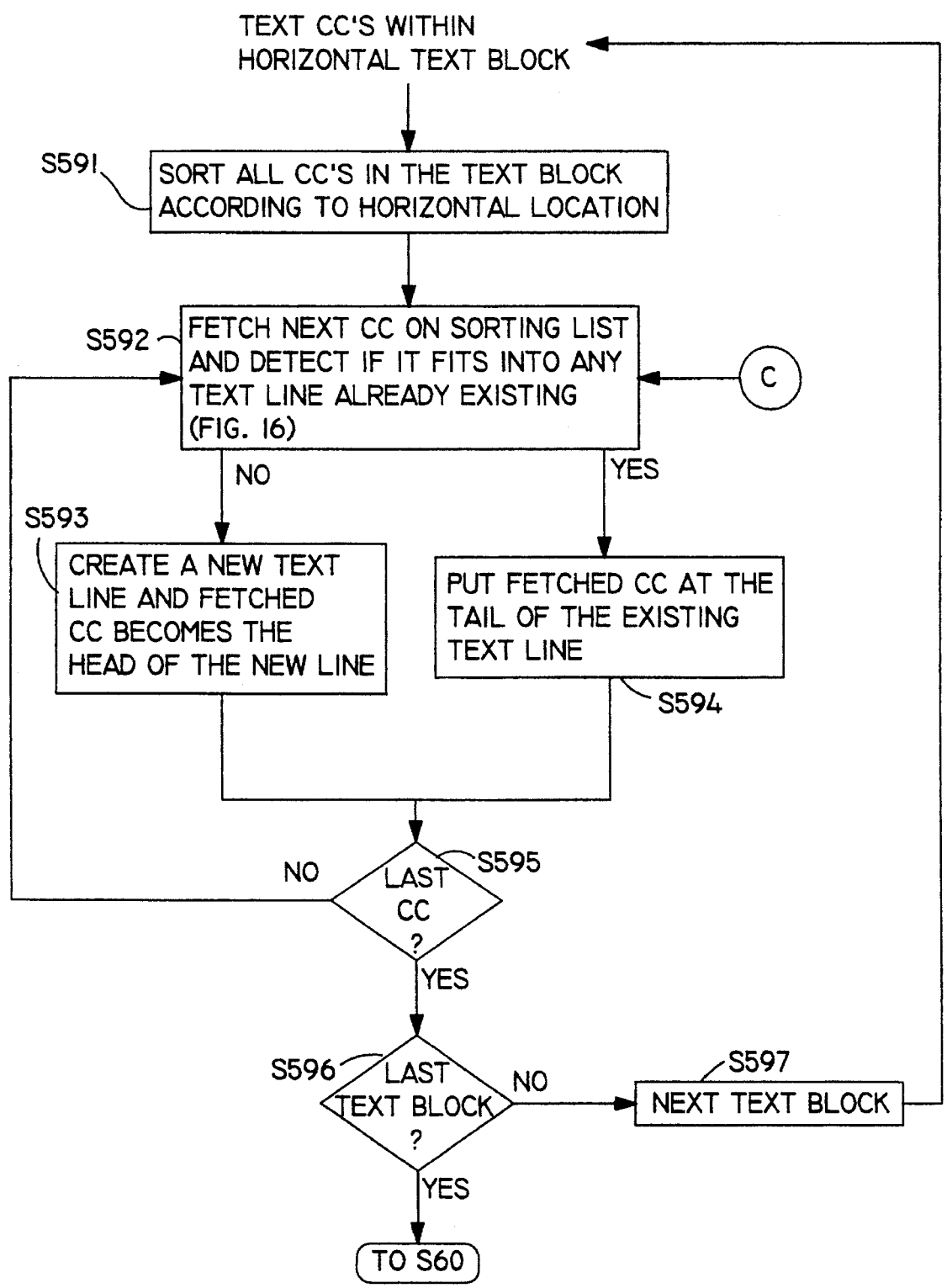
FIG. 15 is a flowchart for describing step S59 in FIG. 5.

Once the direction of all identified text blocks is determined, flow proceeds to step S59 where the text lines for each text block are formed based on the direction identified in step S58. FIG. 15 depicts a detailed flowchart showing this processing.

FIG. 15 describes processing of text connected components in a horizontal text block. The processing of connected components within a vertical text block is similar and will not be described in detail. At step S591, the text components within the horizontal text block are sorted according to their horizontal location. Thereafter, in step S592, the next connected component in the sorting list is fetched, and it is detected whether the fetched connected component fits into any text line already existing. The detailed processing for this determination will now be described with reference to FIG. 16 which comprises FIGS. 16A–16E.

Figure 16A:
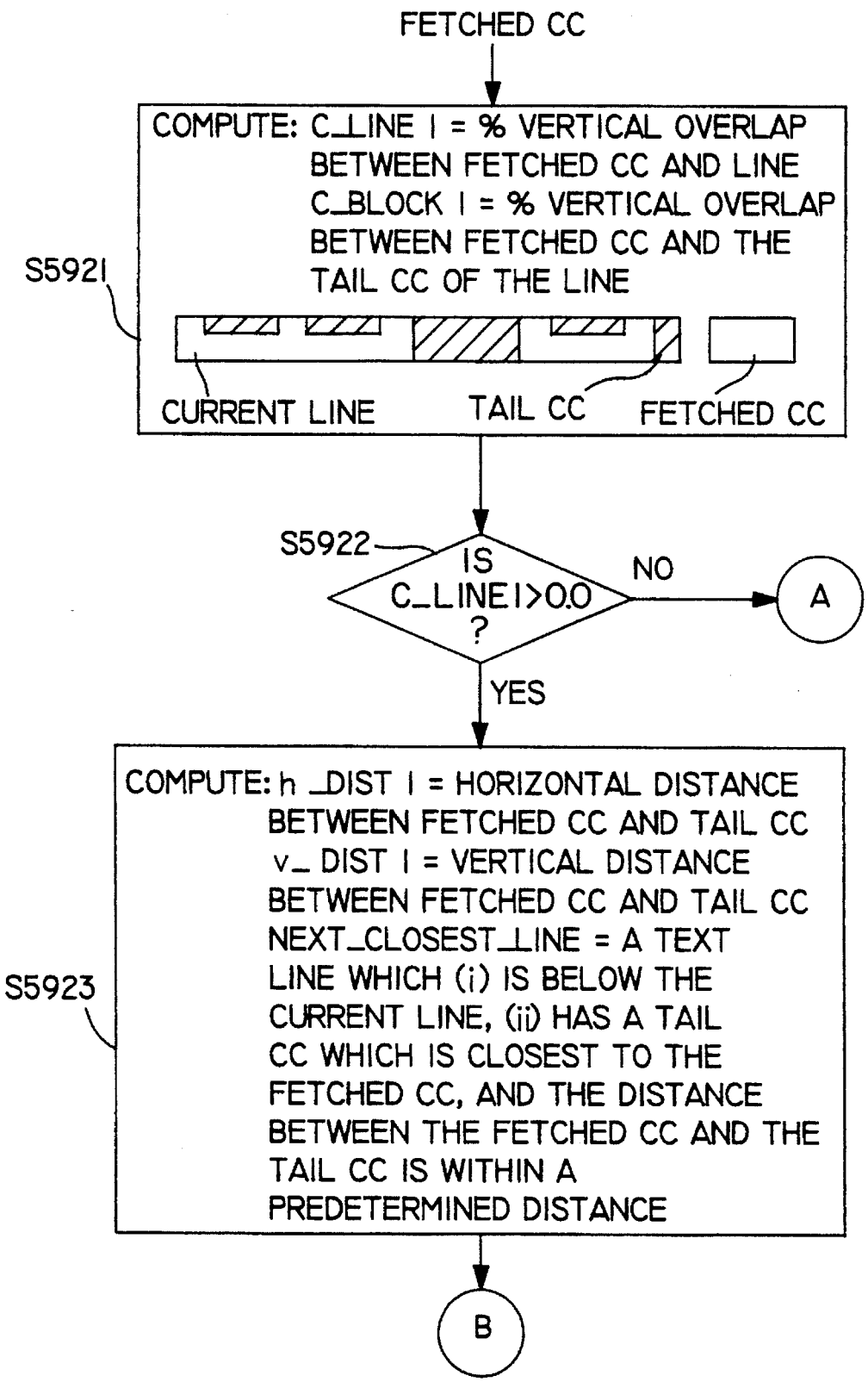
FIGS. 16A, 16B, 16C, 16D, and 16E, is a flowchart for describing step S592 in FIG. 15.
Figure 16B:
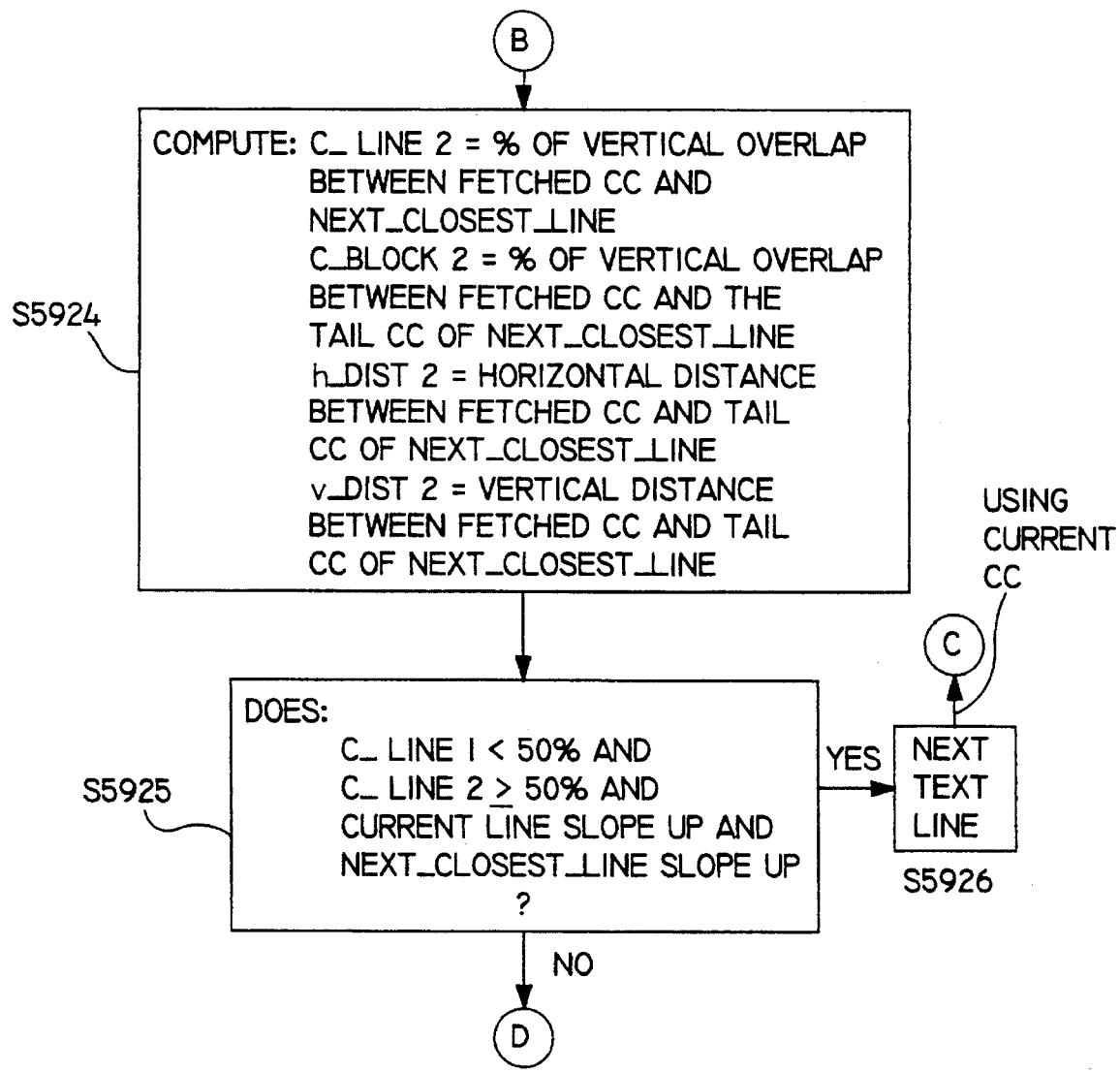

In FIG. 16A, the connected component fetched in step S592 is used to compute values C_LINE1 and C_BLOCK1, in step S5921. C_LINE1 is the percent vertical range overlap between the fetched connected component and the current text line, while C_BLOCK1 is the percent vertical range overlap between the fetched connected component and the tail connected component of the current text line. The depiction within step S5921 in FIG. 16A shows the relationship between the current text line, the tail connected component thereof, the fetched connected component, and their vertical range overlap.

In step S5922, it is determined whether C_LINE1 is greater than zero or not. If not, flow proceeds to step S5936 which will be described in greater detail with respect to FIG. 16E. On the other hand, if it is determined in step S5922 that C_LINE1 is greater than zero, the three values h_dist1, v_dist1, and NEXT_CLOSEST_LINE are determined. The value h_dist1 is the horizontal distance between the fetched connected component and the tail connected component of the current text line. The value v_dist1 is the vertical distance between the fetched connected component and the tail connected component of the current text line. The value NEXT_CLOSEST_LINE is a text line which (i) is below the current line, and (ii) has a tail connected component which is closest to the fetched connected component, and the distance between the fetched connected component and the tail connected component is within a predetermined distance. Flow then proceeds to step S5924 in FIG. 16B.

In step S5924, the values C_LINE2, C_BLOCK2, h_dist2, and v_dist2 are determined. The value C_LINE2 is the percent of vertical range overlap between the fetched connected component and NEXT_CLOSEST_LINE. The value C_BLOCK2 is the percentage of vertical range overlap between the fetched connected component and the tail connected component of NEXT_CLOSEST_LINE. The value h_dist2 is the horizontal distance between the fetched connected component and the tail connected component of NEXT_CLOSEST_LINE. The value v_dist2 is the vertical distance between the fetched connected component and the tail connected component of NEXT_CLOSEST_LINE.

Thereafter, flow proceeds to step S5925 where it is determined whether C_LINE1 is less than 50% and C_LINE2 is greater than or equal to 50% and the current line slopes upward and NEXT_CLOSEST_LINE slopes upward. If the relationships of step S5925 are met, flow proceeds to step S5926 where the next horizontal text line is chosen, and flow then returns to step S592 in FIG. 15. On the other hand, if the relationships in step S5925 are not met, flow proceeds to step S5927 in FIG. 16C.

Figure 16C:
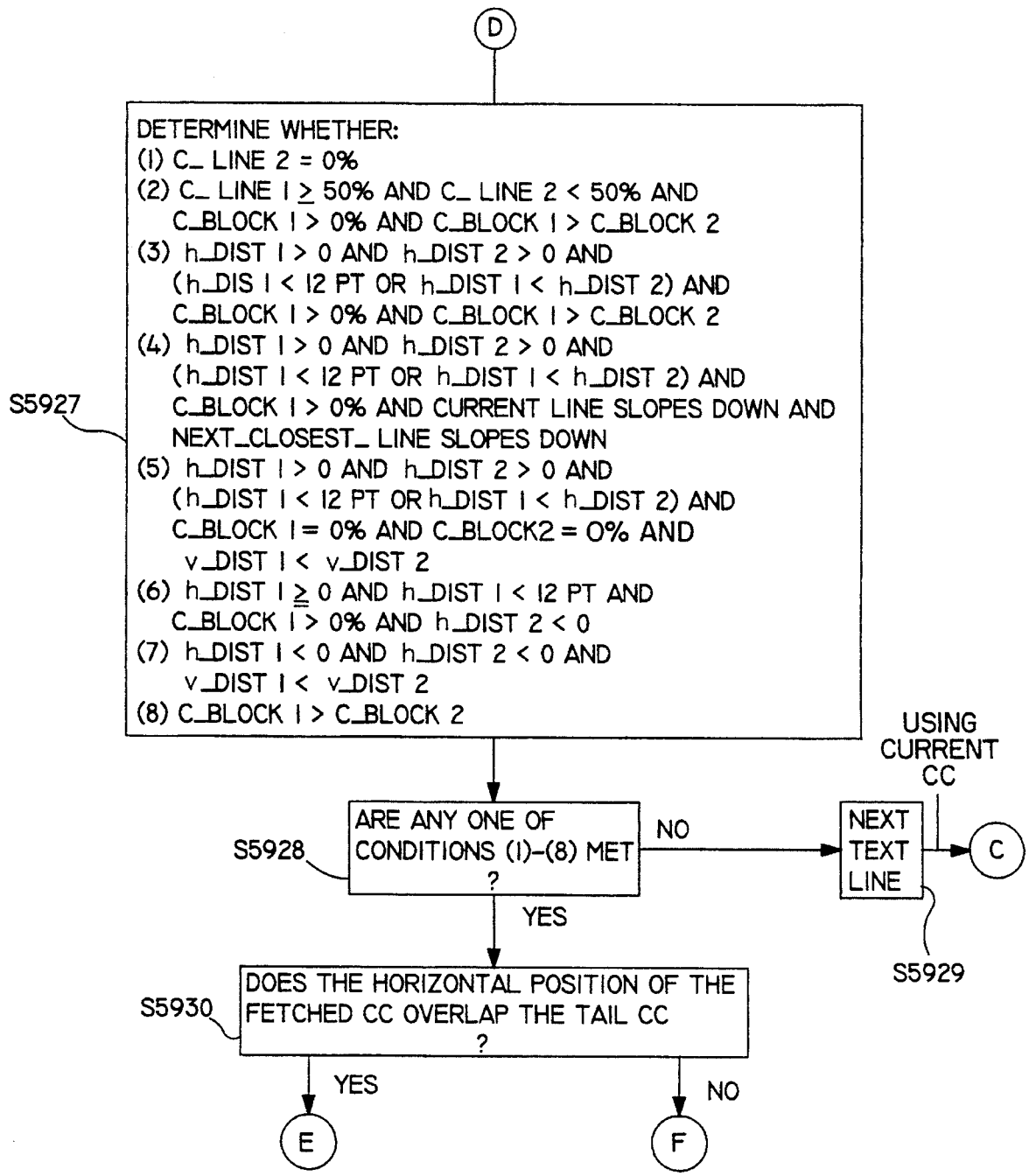

In FIG. 16C, step S5927 determines whether eight relationships exist. These relationships are as follows:

(1) C_LINE2=0%

(2) C_LINE1≧50% AND C_LINE2<50% AND C_BLOCK1>0% AND C_BLOCK1>C_BLOCK2

(3) h_dist1>0 AND h_dist2>0 AND ($h\_dist1$<12pt or h_dist1<h_dist2) AND C_BLOCK1>0% AND C_BLOCK1>C_BLOCK2

(4) h_dist1>0 AND h_dist2>0 AND (h_dist1<12pt OR h_dist1<h_dist2) AND C_BLOCK1>0% AND CURRENT LINE SLOPES DOWN AND NEXT_CLOSEST_LINE SLOPES DOWN (5) h_dist1>0 AND h_dist2>0 AND (h_dist1<12pt OR h_dist1<h_dist2) AND C_BLOCK1=0% AND C_BLOCK2=0% AND v_dist1<v_dist2

(6) h_dist1≧0 AND h_distl<12pt AND C_BLOCK1>0% AND h_dist2<0

(7) h_dist1<0 AND h_dist2<0 AND v_dist1<v_dist2

(8) C_BLOCK1>C_BLOCK2

Flow then proceeds to step S5928 where it is determined whether any one of the relationships (1) through (8) is met. If none of these relationships is met, flow proceeds to step S5929 where the next horizontal text line is chosen and flow returns to step S592 in FIG. 15. On the other hand, if any of the relationships (1) through (8) is met in step S5928, flow proceeds to step S5930 where it is determined whether the horizontal position of the fetched connected component overlaps the tail connected component of the current text line. If there is overlap, flow proceeds to step S5931, but if there is no overlap, flow proceeds to step S5932.

Figure 16D:
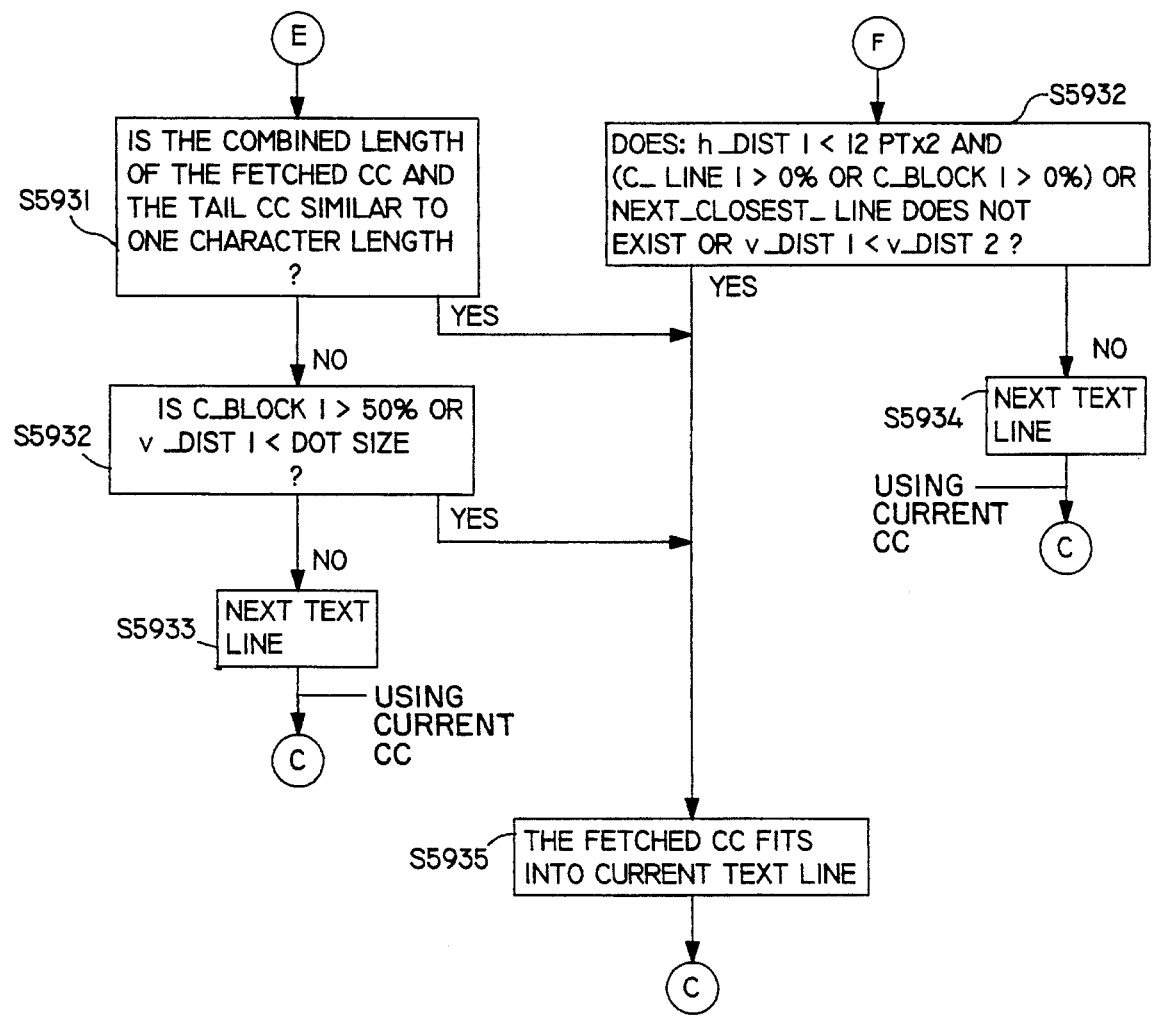

In FIG. 16D, step S5931 determines whether the combined length of the fetched connected component and the tail connected component of the current text line is similar to one character length. If the combined length is not similar to one character length, flow proceeds to step S5935 where the fetched connected component is fit into the current text line. On the other hand, if the combined length is not similar to one character length, flow proceeds to step S5931' where it is determined whether C_BLOCK1 is greater than 50% or v_dist1 is less than one dot size. If either of these relationships is true, flow again proceeds to step S5935 where the fetched connected component is fit into the current horizontal text line. However, if either of the relationships of step S5931 is not met, flow proceeds to step S5933 where the next horizontal text line is selected, and flow thereafter returns to step S592 in FIG. 15.

In step S5932, it is determined whether h_dist1 is less than 12 pt×2, and (C_LINE1 is greater than 0% or $C_{13}$ BLOCK1 is greater than 0%) or NEXT_CLOSEST_LINE does not exist, or v_distl is less than v_dist2. If these conditions are satisfied, it is again determined that the fetched connected component fits within the current text line, and flow proceeds through step S5935 to step S592 in FIG. 15. If the relationships of step S5932 are not met, the next text line is selected at step S5934, and flow again returns to step S592 in FIG. 15.

Figures 16, 16E:
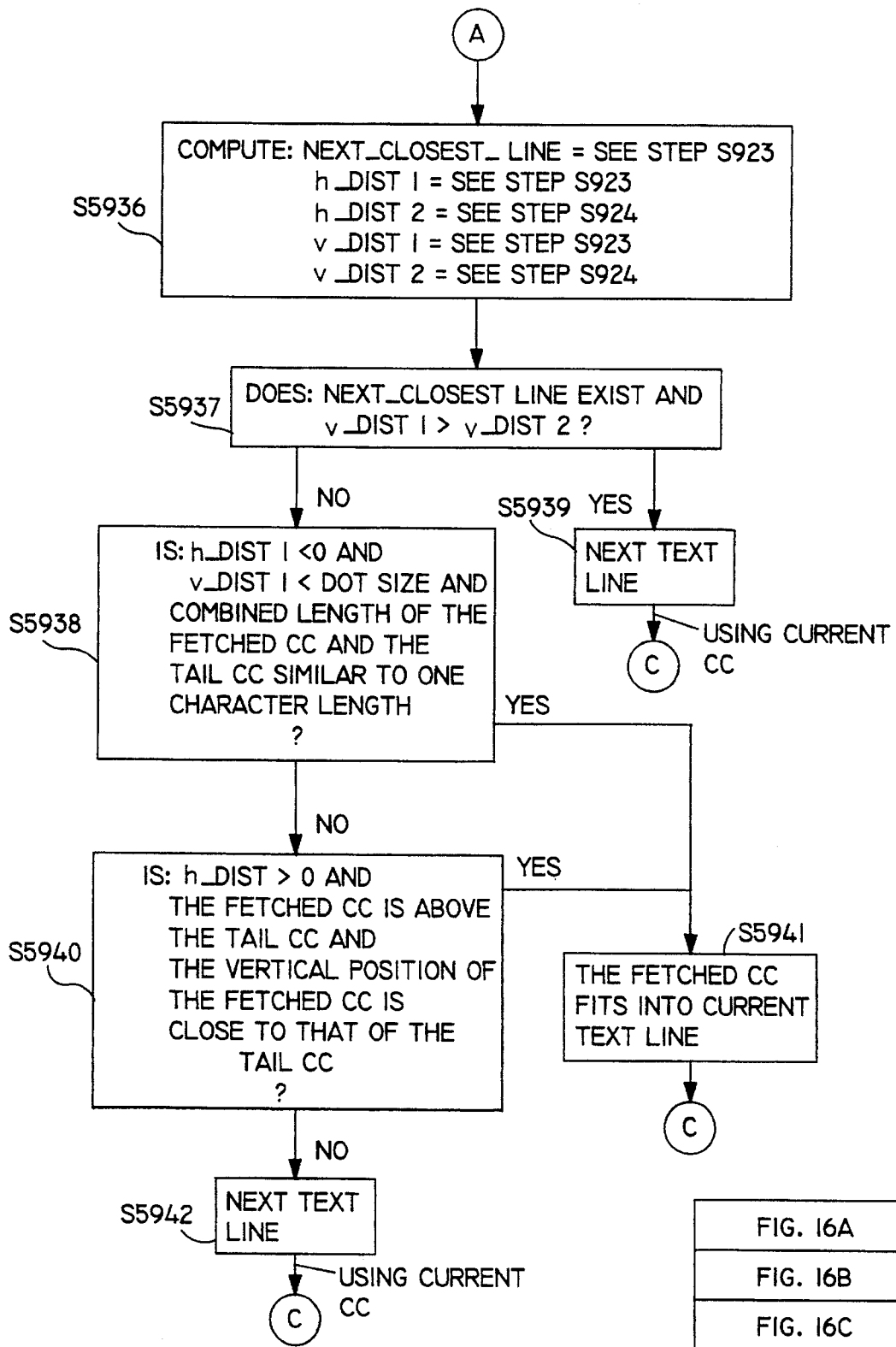
FIG. 16, comprising

Reverting to FIG. 16A, if, in step S5922, it is determined that C_LINE1 is not greater than zero, flow proceeds to step S5936 in FIG. 16E. In step S5936, the values $NEXT_{13}$ CLOSEST_LINE, h_dist1, h_dist2, v_dist1, and v_dist2 are determined, as outlined above with respect to steps S923 and S924.

At step S5937, it is determined whether NEXT_CLOSEST_LINE exists and v_dist1 is greater than v_dist2. If the answer is YES, flow proceeds to step S5939 where the next horizontal text line is chosen, and flow then returns to step S592 in FIG. 15. However, if the relationships of step S5937 do not exist, flow proceeds to step S5938 where it is determined whether h_distl is less than zero and v_distl is less than or equal to one dot size and the combined length of the fetched connected component and the tail connected component is similar to one character length. If these relationships are true, it is determined that the fetched connected component fits within the current horizontal text line at step S5941, and flow returns to step S592 in FIG. 15. If the relationships of S5938 are not true, flow proceeds to step S5940 where it is determined whether h_dist1 is greater than or equal to zero, and the fetched connected component is above the tail connected component, and the vertical position of the fetched connected component is close to that of the tail connected component. If this relationship is true, it is again determined that the fetched connected component fits within the current horizontal text line at step S5941, and flow again returns to step S592 in FIG. 15. If these relationships are not true, flow proceeds to step S5942 where the next horizontal text line is chosen, and flow returns to step S592 in FIG. 15.

After all of the text lines have been formed for each text block in step S59 of FIG. 5, flow advances to step S60 where post-processing of the blocks may be performed. Post-processing may be tailored to suit a particular follow-on procedure such as character recognition, data compression, etc. For purposes of this application, post-processing of the blocks for follow-on character recognition will be described. The purpose of such post-processing is to make the text and non-text block representation more compact and cleaner. In post-processing, text blocks may be combined with other text or non-text blocks, and non-text blocks may be combined with other non-text or text blocks, as desired, to ease further processing such as character recognition. First, the skew of the entire page is calculated using, for example, a least squares approximation to approximate the skew angle of the formed text lines (determined in step S59) based on the connected components contained in that text line. The page skew will then be the average of the skew angles of the text lines on the page.

Figure 17:
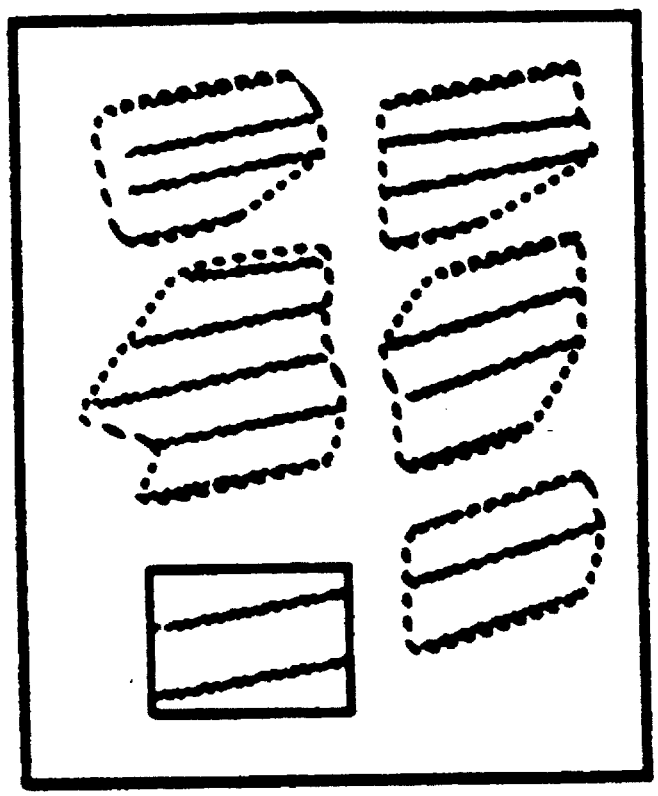
FIG. 17 is a schematic depiction of irregularly-shaped text blocks.

If the page is determined to be skewed only a little (e.g. where the gap between the rectangle or irregular curve surrounding each text block is clear, as in FIG. 17), a number of further processing steps can be carried out. First, the text (or title) block may be combined with a title block depending upon whether they are surrounding rectangles or irregular curves overlap, their orientation, etc. Secondly, it can be determined whether some half-tone (or gray-scale) picture fully occupies a square area in order to judge whether some small text block is really a text block or just a portion of a non-text block, such as a picture. Third, a column analysis may be made and based on the column information, the text blocks may be combined. Such a combination basically depends on whether the blocks are within the same column, if they are close enough to each other, if the combination overlaps other blocks, and if they have the same orientation.

If the page has been determined to be skewed more than a little, the three processing steps are skipped in the skewed case. A step is then carried out in which a small text block may be combined with its close neighbor. This combination would depend on the attribute of the neighbor, the closeness of the neighbor, and characteristics of the text block itself. After such a combination, the attribute of the combined text block may be changed so as to be consistent with the combined neighbor text block.

Also, text blocks may be combined with title blocks or blocks which contain only one unknown connected component. This combination depends on the relative location, the direction of the blocks, the relative size of the blocks, etc.

Lastly, the post-processing of the blocks may comprise combining certain non-text blocks. Such a combination would depend on the relative location of the non-text blocks, the attributes of those blocks, etc. For example, some picture blocks may be combined if they are detected as belonging to the same overall picture. Such post-processing steps may be carried out in order to ease the follow-on character recognition processing. A detailed flowchart of the post-processing steps is omitted for purposes of clarity, but reference may be made to the attached appendix of computer program listings.

Thus, what has been described is method and apparatus for effectively and efficiently selecting text and non-text blocks in a stored document in which both vertical and horizontal text blocks may be recognized, and in which a skewed document is not required to be rotated prior to the formation of the text block.

The individual components shown in outline or designated by blocks in the Drawings are all well-known in the character recognition arts, and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of selecting blocks of pixels from pixel image data comprising:

an outlining step in which contours of connected components in the pixel image data are outlined;

a first connecting step in which connected components are selectably connected widthwisely based on size and proximity to other connected components to form lines;

a second connecting step in which lines of widthwise connected components are selectably connected vertically based on size and proximity to other lines to form rectangles around blocks of pixel image data; and a forming step in which an irregularly-shaped curve is formed around each block of pixel image data surrounded by a rectangle which overlaps another block of pixel image data.

2. A method according to claim 1, further comprising an inputting step in which pixel image data is input, wherein said inputting step includes the step of converting the pixel image data into binary pixel image data in the event that the pixel image data is not binary pixel image data.

3. A method according to claim 1, wherein in said forming step, the smallest irregularly-shaped curve is formed around each block of pixel image data.

4. A method according to claim 1, further comprising the step of forming a hierarchical tree of the connected components outlined in said outlining step based on the position of corresponding irregularly-shaped curves formed in said forming step.

5. A method according to claim 4, further comprising the step of classifying the irregularly-shaped curves formed in said forming step into text and non-text blocks.

6. A method according to claim 5, further comprising the step of recognizing character images in the text blocks.

7. A method according to claim 6, further comprising the step of deriving white contours for non-text outlined connected components.

8. A method according to claim 7, wherein non-text blocks are designated as table units in accordance with the number of white contours.

9. A method according to claim 8, further comprising the step of calculating the white contour filling rate.

10. A method according to claim 10, wherein the non-text block is not designated as image data in the event that the white contour filling rate is high.

11. A method according to claim 9, further comprising the step of recombining non-grid-arranged white contours.

12. A method according to claim 11, wherein the non-text block is designated as a table in the event that the recombination rate is not high.

13. A method according to claim 7, wherein white contours are calculated in 4 directions.

14. A method according to claim 1, wherein contours of connected components are outlined in at least 8 directions.

15. A method according to claim 1, wherein in said outlining step, contours of connected components are outlined only at exterior portions of the connected components.

16. A method according to claim 1, further comprising the step of detecting gaps in the pixel image data, and wherein in said first connecting step connected components are not connected widthwisely into lines in the event that a gap separates the connected components.

17. A method according to claim 16, wherein columns are detected in accordance with vertically-extending gaps between connected components.

18. A method according to claim 1, wherein said second connecting step includes the step of determining non-text boundaries between lines of text data connected in said first connecting step, and wherein said second connecting step does not connect lines vertically into blocks in the event that there is an intervening non-text boundary.

19. A method according to claim 1, further comprising the step of compressing the pixel image data before said outlining step.

20. Apparatus for selecting blocks of pixels from pixel image data comprising:

storing means for storing the pixel image data; and processing means for (1) outlining contours of connected components in the stored pixel image data, (2) selectably connecting connected components widthwisely based on size and proximity to other connected components to form lines, (3) selectably connecting lines of widthwise connected components vertically based on size and proximity to other lines to form rectangles around blocks of pixel image data, and (4) forming an irregularly-shaped curve around each block of pixel image data surrounded by a rectangle which overlaps another block of pixel image data.

21. An apparatus according to claim 20, further comprising input means for inputting pixel image data into said storing means, said input means including converting means for converting the pixel image data into binary pixel image data in the event that the input pixel image data is not binary pixel image data.

22. An apparatus according to claim 20, wherein said processing means forms the smallest irregularly-shaped curve around each block of pixel image data.

23. An apparatus according to claim 20, wherein said processing means forms a hierarchical tree of the outlined connected components based on the position of the formed corresponding irregularly-shaped curves.

24. An apparatus according to claim 23, wherein said processing means classifies the formed irregularly-shaped curves into text and non-text blocks.

25. An apparatus according to claim 24, wherein said processing means recognizes character images in the text blocks.

26. An apparatus according to claim 24, wherein said processing means derives white contours for non-text outlined connected components.

27. An apparatus according to claim 26, wherein said processing means designates non-text blocks as table units in accordance with the number of white contours.

28. An apparatus according to claim 26, wherein said processing means calculates a white contour filling rate.

29. An apparatus according to claim 28, wherein said processing means does not designate the non-text block as image data in the event that the white contour filling rate is high.

30. An apparatus according to claim 28, wherein said processing means recombines non-grid arranged white contours.

31. An apparatus according to claim 30, wherein said processing means designates the non-text block as a table in the event that the recombination rate is not high.

32. An apparatus according to claim 26, wherein said processing means calculates white contours in four directions.

33. An apparatus according to claim 20, wherein said processing means outlines contours of connected components in at least 8 directions.

34. An apparatus according to claim 20, wherein said processing means outlines the contours of connected components only at exterior portions of the connected components.

35. An apparatus according to claim 20, wherein said processing means detects gaps in the pixel image data, and does not connect connected components widthwisely into lines in the event that a gap separates the components.

36. An apparatus according to claim 35, wherein said processing means detects columns in accordance with vertically-extending gaps between connected components.

37. An apparatus according to claim 20, wherein said processing means determines non-text boundaries between lines of connected text data, and wherein said processing means does not connect lines vertically into blocks in the event that there is an intervening non-text boundary.

38. An apparatus according to claim 20, wherein said processing means compresses the pixel image data before outlining.

39. A method for forming a text file of characters in pixel image data, comprising the steps of:

inputting and storing binary pixel image data;

selecting blocks of stored pixel image data;

outlining contours of connected components in the stored pixel image data;

determining whether outlined connected components include text units or non-text units;

selectively connecting text units widthwisely to form text lines based on proximity of adjacent text units;

selectively connecting text lines vertically to form rectangles around blocks of text units based on proximity of adjacent text lines and the position of non-text units between text lines;

surrounding each block of text units in the blocks of text units with an irregularly-shaped curve when rectangles around the blocks of text units overlap;

forming a hierarchical tree of blocks of text units based on the connected components outlined in said step of outlining; and segmenting the treed blocks of text units into lines of pixel image data by adaptively dividing blocks of text units into at least one line.

40. A method according to claim 39, further comprising a pre-processing step in which the pixel image data is pre-processed.

41. A method according to claim 40, wherein said pre-processing step includes the step of image compression.

42. A method according to claim 41, wherein said pre-processing step includes the step of enhancing pixel image data.

43. A method according to claim 39, further comprising the step of white-contour tracing the interior of non-text units.

44. A method according to claim 43, further comprising the step of appending designators to non-text units.

45. A method according to claim 43, wherein table designators are appended to non-text units based on the number of white contours contained therein.

46. A method according to claim 39, wherein in said forming step, the hierarchical tree is formed with both text units and non-text units.

47. Apparatus for forming a text file of characters in pixel image data, comprising:

inputting means for inputting pixel image data;

storing means for storing the inputted pixel image data; and processing means for (1) outlining contours of connected components in the stored pixel image data, (2) determining whether outlined connected components include text units or non-text units, (3) selectively connecting text units widthwisely to form text lines based on proximity of adjacent text units, (4) selectively connecting text lines vertically to form rectangles around blocks of text units based on proximity of adjacent text lines and on the position of non-text units between text lines, (5) surrounding each block of text units in the blocks of text units with an irregularly-shaped curve when rectangles around the blocks of text units overlap, (6) forming a hierarchical tree of the blocks of text units based on the outlined connected components, and (7) segmenting the treed text blocks into lines of pixel image data by adaptively dividing blocks of text units into at least one line.

48. Apparatus according to claim 47, wherein said processing means pre-processes the input pixel image data.

49. An apparatus according to claim 47, wherein said processing means forms the hierarchical tree with both text units and non-text units.

* * * * *

UNITED STATES PATENT AND TRADEMARK OFFICE
CERTIFICATE OF CORRECTION

PATENT NO. : 5,588,072

DATED : December 24, 1996

INVENTOR : Shin-Ywan Wang

It is certified that error appears in the above-identified patent and that said Letters Patent is hereby corrected as shown below:

Column 26, line 21, change "claim 10" to --claim 9--.

Column 5, line 46, change "scanned-in" to --scan-in--.

Column 23, line 15, change "C LINE1≥50%" to --C_LINE1≥50%--.

Column 23, line 16, change "C BLOCK1" to --C_BLOCK1--.

line 17, change "h dist 1>0" to --h_dist1>0--, and "(h-$_{dist1}$<" to --(h_dist1<--.

UNITED STATES PATENT AND TRADEMARK OFFICE
CERTIFICATE OF CORRECTION

PATENT NO. : 5,588,072

DATED : December 24, 1996

INVENTOR : Shin-Ywan Wang

It is certified that error appears in the above-identified patent and that said Letters Patent is hereby corrected as shown below:

Column 23, line 27, change "C BLOCK1=0%" to --C_BLOCK1=0%--.

line 62, change "$C_{13}$" to --C_--.

Column 24, line 6, change "$NEXT_{13}$" to --NEXT_--.

line 16, change "h dist1" to --h_dist1--.

Signed and Sealed this

Twenty-first Day of October 1997

Attest:

BRUCE LEHMAN

*Attesting Officer*      *Commissioner of Patents and Trademarks*